(12) United States Patent
Nakamura

(10) Patent No.: US 10,493,968 B2
(45) Date of Patent: Dec. 3, 2019

(54) HYDRAULIC PRESSURE GENERATING DEVICE

(71) Applicant: AUTOLIV NISSIN BRAKE SYSTEMS JAPAN CO., LTD., Ueda, Nagano (JP)

(72) Inventor: Motoyasu Nakamura, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 130 days.

(21) Appl. No.: 15/471,200

(22) Filed: Mar. 28, 2017

(65) Prior Publication Data
US 2017/0282881 A1 Oct. 5, 2017

(30) Foreign Application Priority Data
Mar. 30, 2016 (JP) ................................ 2016-069679

(51) Int. Cl.
| | | |
|---|---|---|
| *B60T 13/74* | (2006.01) | |
| *B60T 8/36* | (2006.01) | |
| *B60T 11/16* | (2006.01) | |
| *B60T 13/68* | (2006.01) | |
| *F04B 17/03* | (2006.01) | |

(Continued)

(52) U.S. Cl.
CPC ............ *B60T 13/745* (2013.01); *B60T 8/368* (2013.01); *B60T 11/165* (2013.01); *B60T 13/686* (2013.01); *F04B 17/03* (2013.01); *F15B 7/001* (2013.01); *F15B 7/003* (2013.01);
(Continued)

(58) Field of Classification Search
CPC ....... B60T 8/368; B60T 8/3685; B60T 13/745
See application file for complete search history.

(56) References Cited

U.S. PATENT DOCUMENTS

2013/0232968 A1* 9/2013 Ohnishi ................ B60T 8/3685
60/545
2013/0333376 A1* 12/2013 Murayama .............. B60T 7/042
60/545

(Continued)

FOREIGN PATENT DOCUMENTS

| EP | 3184384 | 6/2017 |
|---|---|---|
| JP | 2014525875 | 10/2014 |
| WO | 2014177307 | 6/2014 |

OTHER PUBLICATIONS

European Search Report for EP Application No. 17163549.3-1762 dated Jul. 24, 2017, 9 pages.

*Primary Examiner* — Thomas E Lazo
(74) *Attorney, Agent, or Firm* — Andrew M. Calderon; Roberts Mlotkowski Safran Cole & Calderon, P.C.

(57) ABSTRACT

A hydraulic pressure generating device includes a base body having a master cylinder configured to generate a brake hydraulic pressure and a slave cylinder configured to generate a brake hydraulic pressure. The base body is provided with a motor configured as a driving source for the slave cylinder and a control device configured to control the motor. A motor shaft of the motor, a cylinder axis of the master cylinder, and a cylinder axis of the slave cylinder are disposed in parallel with each other. Then a virtual plane including the cylinder axis of the master cylinder is set as a reference plane, a housing of the control device is disposed on one side of the reference plane and the motor is disposed on the other side of the reference plane.

20 Claims, 12 Drawing Sheets

(51) Int. Cl.
*F15B 7/00* (2006.01)
*F15B 7/08* (2006.01)
*B60T 8/40* (2006.01)

(52) U.S. Cl.
CPC ............. *F15B 7/005* (2013.01); *F15B 7/08* (2013.01); *B60T 8/4081* (2013.01)

(56) References Cited

U.S. PATENT DOCUMENTS

| | | | |
|---|---|---|---|
| 2014/0216866 A1* | 8/2014 | Feigel | B60T 7/042 |
| | | | 188/156 |
| 2015/0158466 A1* | 6/2015 | Nakamura | B60T 11/16 |
| | | | 303/3 |
| 2015/0166030 A1* | 6/2015 | Kobayashi | B60T 13/58 |
| | | | 303/14 |
| 2016/0059835 A1 | 3/2016 | Gilles et al. | |
| 2016/0152219 A1 | 6/2016 | Besier et al. | |
| 2017/0182992 A1* | 6/2017 | Matsunaga | B60T 13/142 |

* cited by examiner

HYDRAULIC PRESSURE GENERATING DEVICE

CROSS-REFERENCE TO RELATED APPLICATION

The present application claims priority under 35 U.S.C. § 119 to Japanese Patent Application No. 2016-069679, filed Mar. 30, 2016. The contents of this application are incorporated herein by reference in their entirety.

The present invention relates to a hydraulic pressure generating device usable in a brake system for a vehicle.

As a hydraulic pressure generating device for generating a brake hydraulic pressure in response to the amount of stroke (the amount of operation) on a brake pedal, there is a device including a master cylinder configured to generate a brake hydraulic pressure by a piston connected to a brake pedal, a stroke simulator configured to apply a pseudo operation reaction force to the brake pedal by a biased piston, and a slave cylinder configured to generate a brake hydraulic pressure by a piston using a motor as its driving source.

As a hydraulic pressure generating device as described above, there is a device including one base body having a master cylinder, a stroke simulator, and a slave cylinder (see Japanese Patent Application Laid-Open No. 2014-525875 for instance).

In the above-described hydraulic pressure generating device of the related art, cylinder bores of both of the master cylinder and the stroke simulator are formed in the rear surface of the base body, and a cylinder bore of the slave cylinder is formed in the right surface of the base body. Therefore, in the hydraulic pressure generating device of the related art, a brake pedal is disposed on the rear surface side of the base body, and a motor is attached to the right surface of the base body. As described above, in the hydraulic pressure generating device of the related art, since the motor significantly protrudes from one side of the base body, there is a problem that the stability of the hydraulic pressure generating device is low.

The present invention was made to solve the above-described problem, and an object of the present invention is to provide a hydraulic pressure generating device capable of improving stability.

In order to solve the above-described problem, the present invention may provide a hydraulic pressure generating device which includes a base body having a master cylinder configured to generate a brake hydraulic pressure and a slave cylinder configured to generate a brake hydraulic pressure. On the base body, a motor may be configured as a driving source for the slave cylinder, and a control device configured to control the motor are provided. In the hydraulic pressure generating device, a motor shaft of the motor, the cylinder axis of the master cylinder, and the cylinder axis of the slave cylinder may be disposed in parallel. In the hydraulic pressure generating device, when a virtual plane including the cylinder axis of the master cylinder is set as a reference plane, a housing of the control device may be disposed on one side of the reference plane, and the motor is disposed on the other side of the reference plane.

According to the hydraulic pressure generating device of the present invention, the virtual plane including the cylinder axis of the master cylinder is set as the reference plane, and the housing and the motor are disposed on one side and the other side of the base body with good balance. Therefore, it is possible to reduce the size of the hydraulic pressure generating device while improving the stability of the hydraulic pressure generating device.

For example, if the cylinder axis of the slave cylinder and the output axis of the motor are disposed below the cylinder axis of the master cylinder, the slave cylinder and the motor are disposed below the master cylinder. In this case, the gravity center of the hydraulic pressure generating device is low. Especially, since the motor is a heavy component, it is possible to effectively improve the stability of the hydraulic pressure generating device by disposing the motor at a lower portion of the hydraulic pressure generating device.

Also, it is possible to dispose the motor and both cylinders with good balance by disposing the motor shaft of the motor, the cylinder axis of the master cylinder, and the cylinder axis of the slave cylinder in parallel like in the hydraulic pressure generating device of the present invention.

In the above-described hydraulic pressure generating device, in a case where the motor has a motor connector to be electrically connected to a control board contained in the housing, it is preferable that the cylinder axis of the motor connector be perpendicular to the motor shaft.

According to this configuration, since it is possible to extend the motor connector toward the housing, it is possible to electrically connect the motor and the housing at a relatively short distance. Therefore, it is possible to obtain a hydraulic pressure generating device capable of further reducing noise as compared to a case of connecting the motor and the housing by cables.

In the above-described hydraulic pressure generating device, in a case where the housing includes a cylindrical peripheral wall portion, a lid part attached to an opening of the peripheral wall portion, and a housing connector to be connected to the motor connector, it is preferable that the cylinder axis of the peripheral wall portion, the cylinder axis of the motor connector, and the cylinder axis of the housing connector be disposed in the same direction.

According to this configuration, it is possible to easily establish the electrical connection of the motor and the housing by connecting both connectors, with the base body interposed therebetween. Also, it is possible to electrically connect the motor and the housing at a relatively short distance by connecting both connectors.

In the above-described hydraulic pressure generating device, in a case where the hydraulic pressure generating device includes an solenoid valve which is attached to the base body, it is preferable that the cylinder axis of the housing connector and the axial line of the solenoid valve be disposed in the same direction.

According to this configuration, since the direction in which the solenoid valve is assembled on the base body is the same as the direction in which both connectors are connected, the hydraulic pressure generating device excellent in assembly workability can be obtained.

In the above-described hydraulic pressure generating device, it is preferable that the motor connector and the housing connector have a common cylinder axis in the direction in which the housing is assembled with the base body.

According to this configuration, since it is possible to connect the connectors at the same time as the housing is assembled with the base body, the hydraulic pressure generating device excellent in assembly workability can be obtained.

In the above-described hydraulic pressure generating device, in a case where the a connection terminal member for electrically connecting the motor connector and the housing connector is disposed between the motor connector and the housing connector, it is preferable that the motor connector be connected to the connection terminal member so as to be slidable in the cylinder axis direction.

According to this configuration, it is possible to adjust the distance between the motor and the housing while maintaining the electrical connection of the motor connector and the housing connector. As a result, for example, in a structure in which the motor and the slave cylinder are connected, for example, by a transmission mechanism using a belt, it is easy to adjust the tension of the belt while maintaining the electrical connection of the motor connector and the housing connector. Therefore, the hydraulic pressure generating device excellent in assembly workability can be obtained.

According to the hydraulic pressure generating device of the present invention, the master cylinder, the slave cylinder, and the motor are disposed on the base body with good balance. Therefore, it is possible to reduce the size of the hydraulic pressure generating device while improving the stability of the hydraulic pressure generating device.

An embodiment of the present invention will be described in detail, appropriately with reference to the accompanying drawings.

In the present embodiment, a case of applying a hydraulic pressure generating device of the present invention to a brake system for a vehicle will be described as an example.

Figure 1:
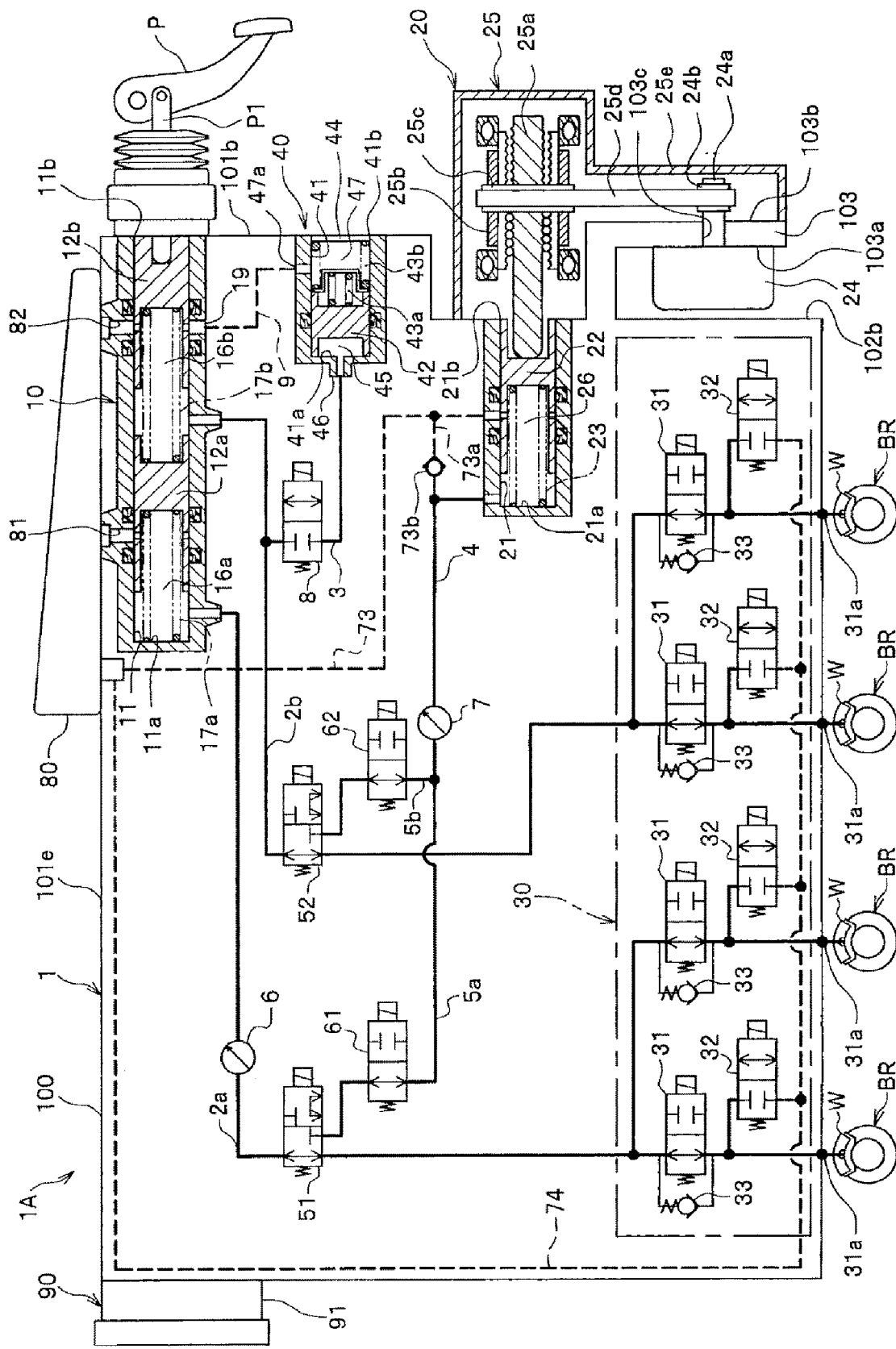
FIG. 1 is a view illustrating the overall configuration of a brake system for a vehicle using a hydraulic pressure generating device of an embodiment.

As shown in FIG. 1, a brake system 1A for a vehicle includes both of a brake-by-wire type brake system configured to operate during activation of a power source (such as an engine or an electric motor) and a hydraulic type brake system configured to operate during stop of the power source or the like.

The brake system 1A for a vehicle can be mounted on a hybrid vehicle using both of an engine and a motor, an electric vehicle or a fuel cell vehicle using only a motor as a power source, or a vehicle using only an engine (an internal combustion engine) as a power source.

The brake system 1A for a vehicle includes a hydraulic pressure generating device 1 which generates a brake hydraulic pressure in response to the stroke amount (operation amount) of a brake pedal P (corresponding to a "brake operating element" of claims) and assists stabilization of motion of a vehicle.

The hydraulic pressure generating device 1 includes a base body 100, a master cylinder 10 configured to generate a brake hydraulic pressure in response to the stroke amount of the brake pedal P, a stroke simulator 40 configured to apply a pseudo operation reaction force to the brake pedal P, and a slave cylinder 20 configured to use a motor 24 as a driving source and generate a brake hydraulic pressure. Further, the hydraulic pressure generating device 1 includes a hydraulic pressure control device 30 configured to control the hydraulic pressure of brake fluid to act on wheel cylinders W of wheel brakes BR, thereby assisting stabilization of motion of a vehicle, an electronic control device 90 (corresponding to a "control device" of claims), and a reservoir tank 80.

Also, in the following description, directions are directions set in order to facilitate a description of the hydraulic pressure generating device 1, and substantially coincide with the directions of the hydraulic pressure generating device 1 as seen in a state where it is mounted on a vehicle. In other words, a direction toward which a rod P1 moves when the brake pedal P is depressed is referred to as the front side (the front end side), and a direction toward which the rod P1 moves when the brake pedal P returns to its original position is referred to as the rear side (the rear end side) (see FIG. 2). Further, a horizontal direction perpendicular to the movement direction (front-rear direction) of the rod P1 is referred to as the left-right direction (see FIG. 2).

Figure 3:
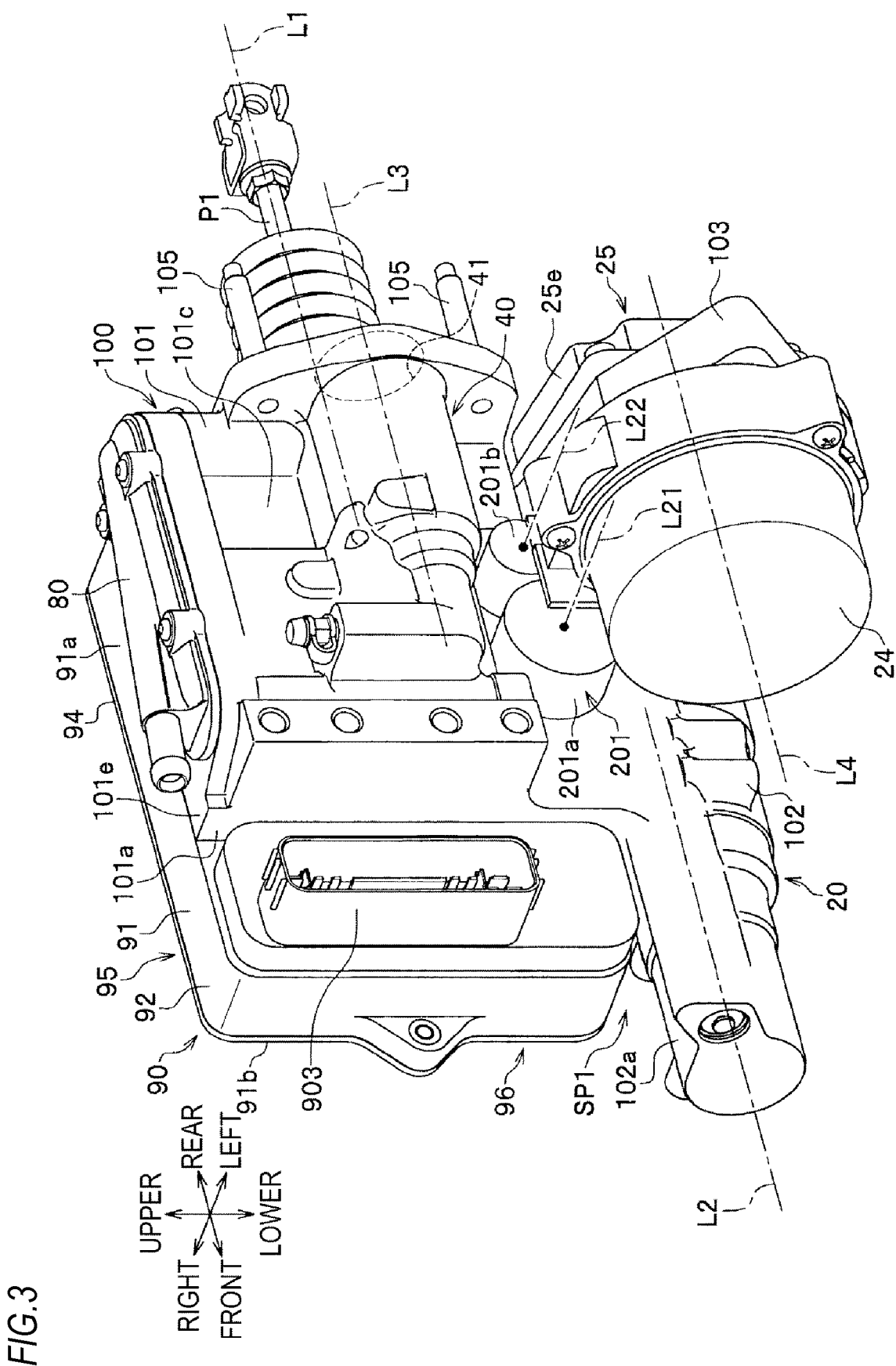
FIG. 3 is a perspective view of the hydraulic pressure generating device of the embodiment as seen from the front side of the left upper side.

The base body 100 is a metal block to be mounted on a vehicle (see FIG. 3). In the base body 100, three cylinder bores 11, 21, and 41 and a plurality of hydraulic passages 2a, 2b, 3, 4, 5a, 5b, 73, 74, and the like are formed. Also, on the base body 100, various components such as the reservoir tank 80 and the motor 24 are attached.

Figure 7:
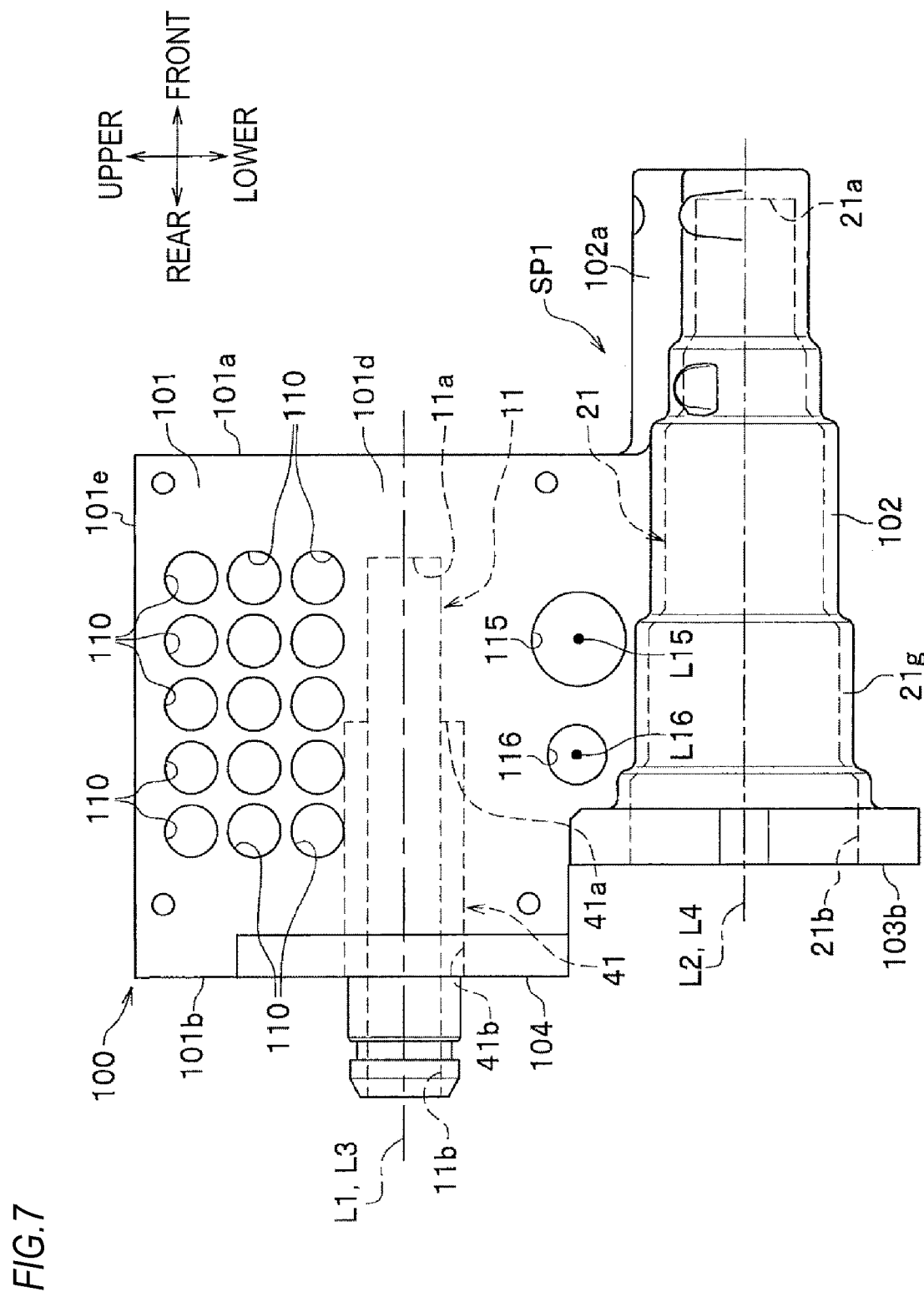
FIG. 7 is a right side view illustrating a base body of the hydraulic pressure generating device of the embodiment.

In the base body 100, as shown in FIG. 7, the first cylinder bore 11, the second cylinder bore 21, and the third cylinder bore 41 are formed in a cylindrical shape with a bottom. Each of the cylinder bores 11, 21, and 41 extends in the front-rear direction, and axial lines L1, L2, and L3 of the cylinder bores 11, 21, and 41 are disposed side by side in parallel to one another (see FIG. 2). Also, the rear end portions of the cylinder bores 11, 21, and 41 are formed in rear surfaces 101b and 102b of the base body 100.

However, the axial lines L1, L2, and L3 may not be parallel to one another (any pair of the axial lines L1, L2, and L3 may be slightly inclined with respect to each other).

As shown in FIG. 1, the master cylinder 10 is a tandem piston type, and includes two first pistons 12b and 12b (a secondary piston and a primary piston) inserted in the first cylinder bore 11, and two coil springs 17b and 17b contained in the first cylinder bore 11.

Between a bottom surface 11a of the first cylinder bore 11 and the first piston 12a (the secondary piston) positioned on the bottom side, a bottom side pressure chamber 16a is formed. The bottom side pressure chamber 16a contains the coil spring 17a. If the first piston 12a moves toward the bottom surface 11a, the coil spring 17a pushes the first piston back toward an opening 11b.

Between the first piston 12a positioned on the bottom side and the first piston 12b (the primary piston) positioned on the opening side, an opening side pressure chamber 16b is formed. Also, the opening side pressure chamber 16b contains the coil spring 17b. If the first piston 12b moves toward the bottom surface 11a, the coil spring 17b pushes the first piston back toward the opening 11b.

The rod P1 of the brake pedal P is inserted in the first cylinder bore 11. The leading end portion of the rod P1 is connected to the first piston 12b positioned on the opening side. As a result, the first piston 12b positioned on the opening side is connected to the brake pedal P by the rod P1.

The two first pistons 12a and 12b slide inside the first cylinder bore 11 in response to a depression force on the brake pedal P, thereby pressing the brake fluid contained in the bottom side pressure chamber 16a and the opening side pressure chamber 16b.

Figure 2:
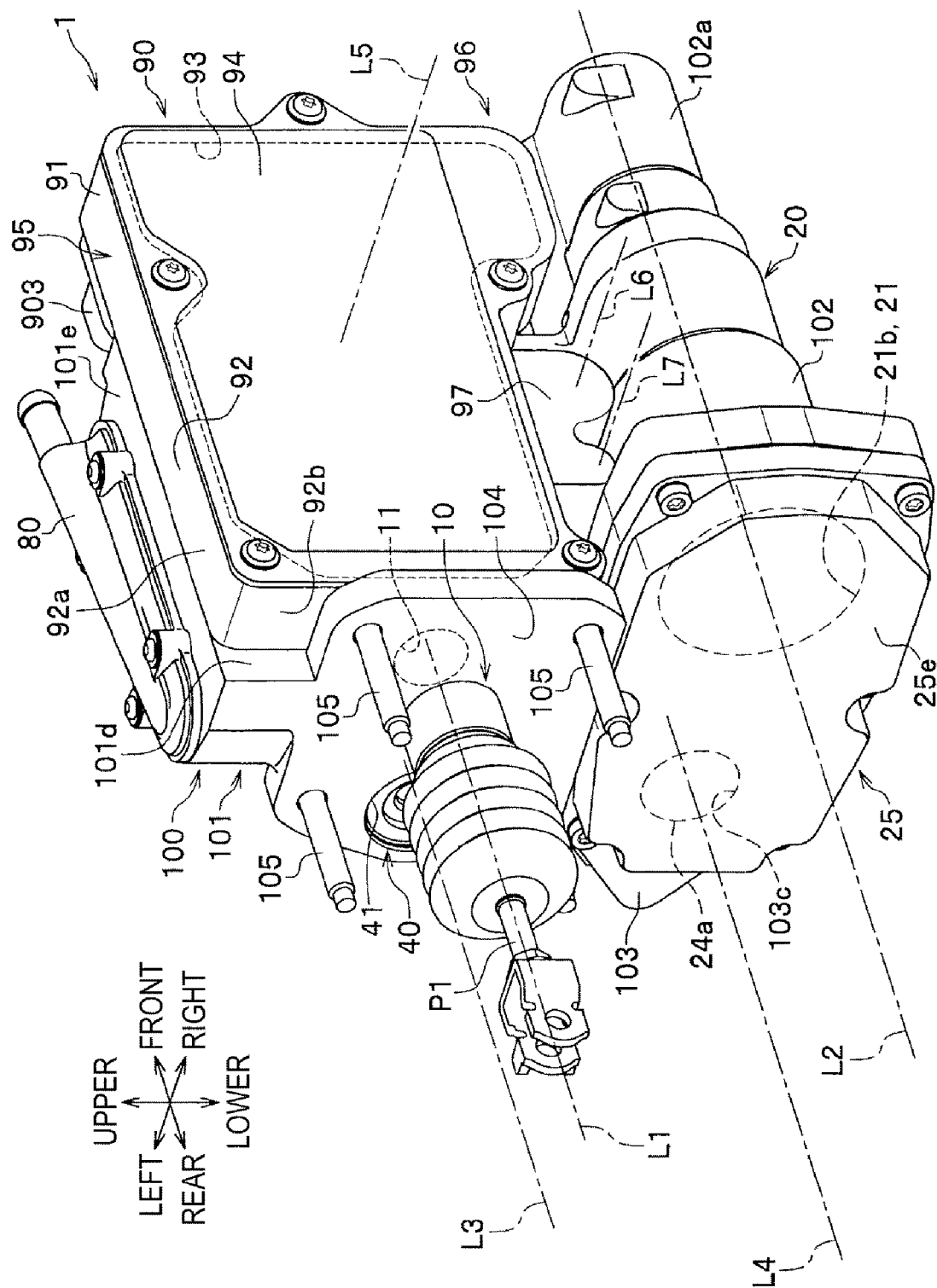
FIG. 2 is a perspective view of the hydraulic pressure generating device of the embodiment as seen from the rear side of the right upper side.

The reservoir tank 80 is a reservoir for supplying the brake fluid to reservoir union ports 81 and 82, and is attached to an upper surface 101e of the base body 100 (see FIG. 2). Two fluid supply parts protruding from the lower surface of the reservoir tank 80 are inserted in the two reservoir union ports 81 and 82 formed in the upper surface 101e of the base body 100. The brake fluid is supplied from the reservoir tank 80 into the bottom side pressure chamber 16a and the opening side pressure chamber 16b through the reservoir union ports 81 and 82.

The stroke simulator 40 includes a third piston 42 inserted in the third cylinder bore 41, a lid member 44 configured to block an opening 41b of the third cylinder bore 41, and two coil springs 43a and 43b contained between the third piston 42 and the lid member 44.

Between a bottom surface 41a of the third cylinder bore 41 and the third piston 42, a pressure chamber 45 is formed. The pressure chamber 45 formed inside the third cylinder bore 41 is connected to the opening side pressure chamber 16b of the first cylinder bore 11 by a hydraulic branch passage 3 and the second main hydraulic passage 2b to be described below.

In the stroke simulator 40, the brake hydraulic pressure generated in the opening side pressure chamber 16b of the master cylinder 10 causes the third piston 42 of the stroke simulator 40 to move against the biasing forces of the coil springs 43a and 43b, whereby the biased third piston 42 applies a pseudo operation reaction force to the brake pedal P.

Also, between the third piston 42 and the lid member 44, a back-pressure chamber 47 is provided. The back-pressure chamber 47 is connected to a reservoir tank connection passage 9 by a port 47a. The reservoir tank connection passage 9 is connected to the reservoir tank 80 by a port 19 of the master cylinder 10.

The slave cylinder 20 is a single piston type, and includes a second piston 22 inserted in the second cylinder bore 21, a coil spring 23 contained in the second cylinder bore 21, the motor 24, and a drive transmission unit 25.

Between a bottom surface 21a of the second cylinder bore 21 and the second piston 22, a pressure chamber 26 is formed. Also, the pressure chamber 26 contains the coil spring 23. If the second piston 22 moves toward the bottom surface 21a, the coil spring 23 pushes the second piston back toward an opening 21b.

The motor 24 is an electric servo motor which is driven and controlled by the electronic control device 90 to be described below. From the central portion of the rear surface of the motor 24, an output shaft 24a protrudes toward the rear side.

Figure 4:
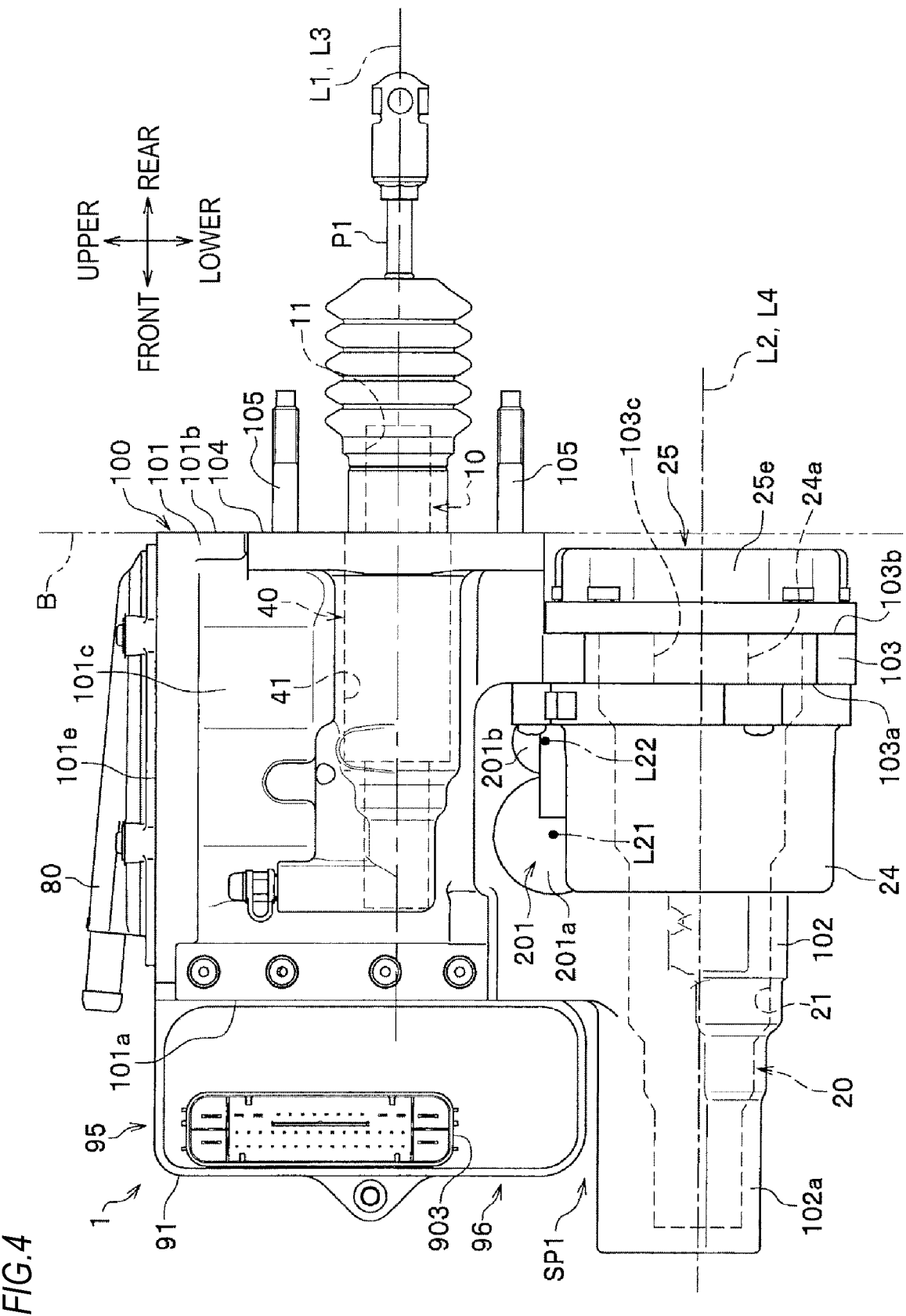
FIG. 4 is a left side view illustrating the hydraulic pressure generating device of the embodiment.

The motor 24 is attached to a motor mounting surface 103a of the front side of a flange portion 103 of the base body 100 (see FIG. 4). The output shaft 24a protrudes from the rear side of the flange portion 103 through a through-hole 103c formed in the flange portion 103. On the rear end portion of the output shaft 24a, a driving pulley 24b is fit.

At an upper portion of the motor 24, a motor connector 201 is provided as shown in FIG. 3. The motor connector 201 includes a motor power connector 201a and a motor control connector 201b. The motor power connector 201a and the motor control connector 201b have cylindrical shapes with bottoms (in FIGS. 10 and 11, only the motor power connector 201a is shown). Cylindrical axes L21 and L22 of the motor power connector 201a and the motor control connector 201b are perpendicular to the axial line L4 of the output shaft 24a of the motor 24, as shown in FIG. 3.

Figure 11:
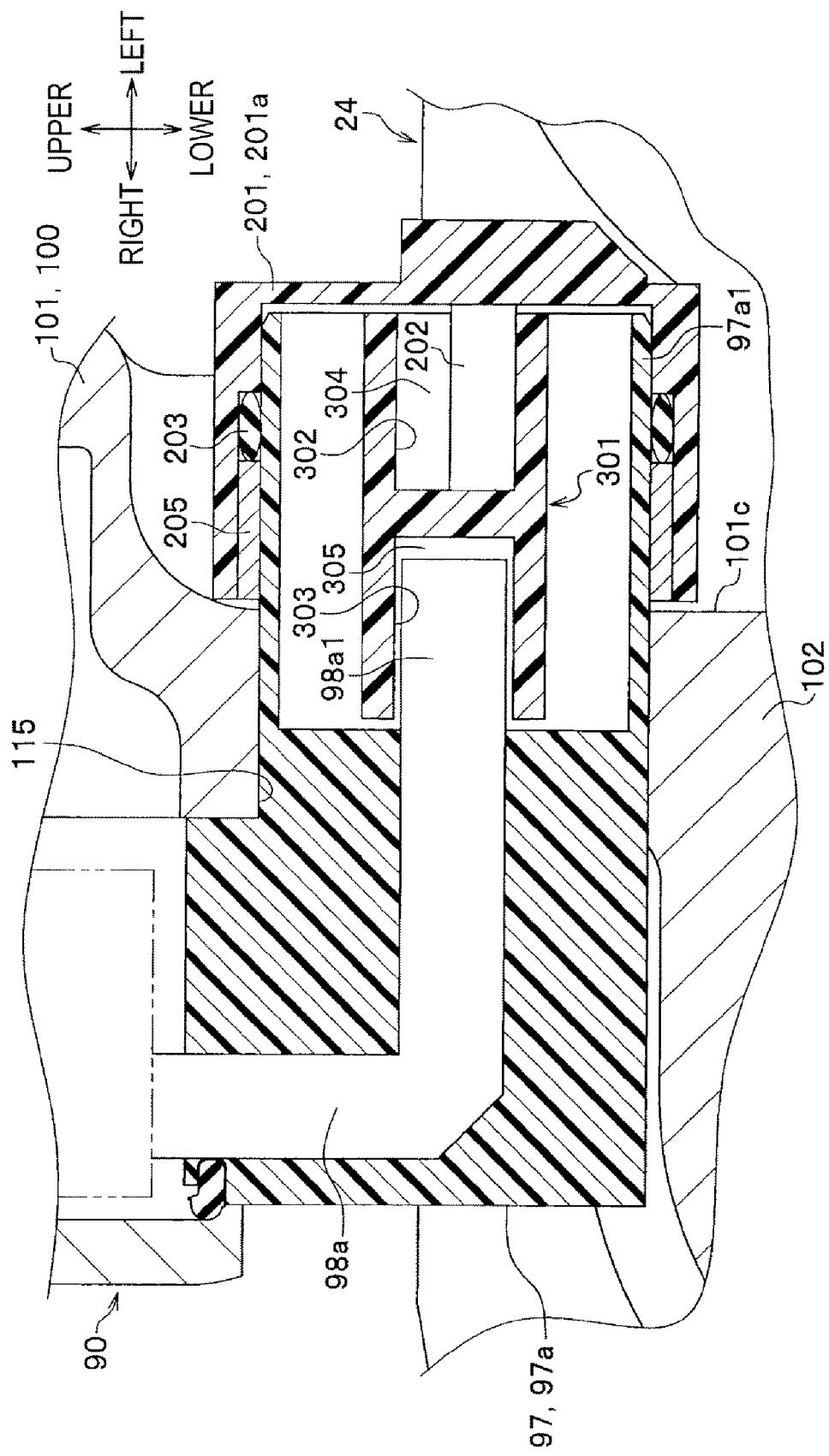
FIG. 11 is an enlarged cross-sectional view illustrating a portion showing the connection structure of a motor connector and a housing connector.
Figure 12:
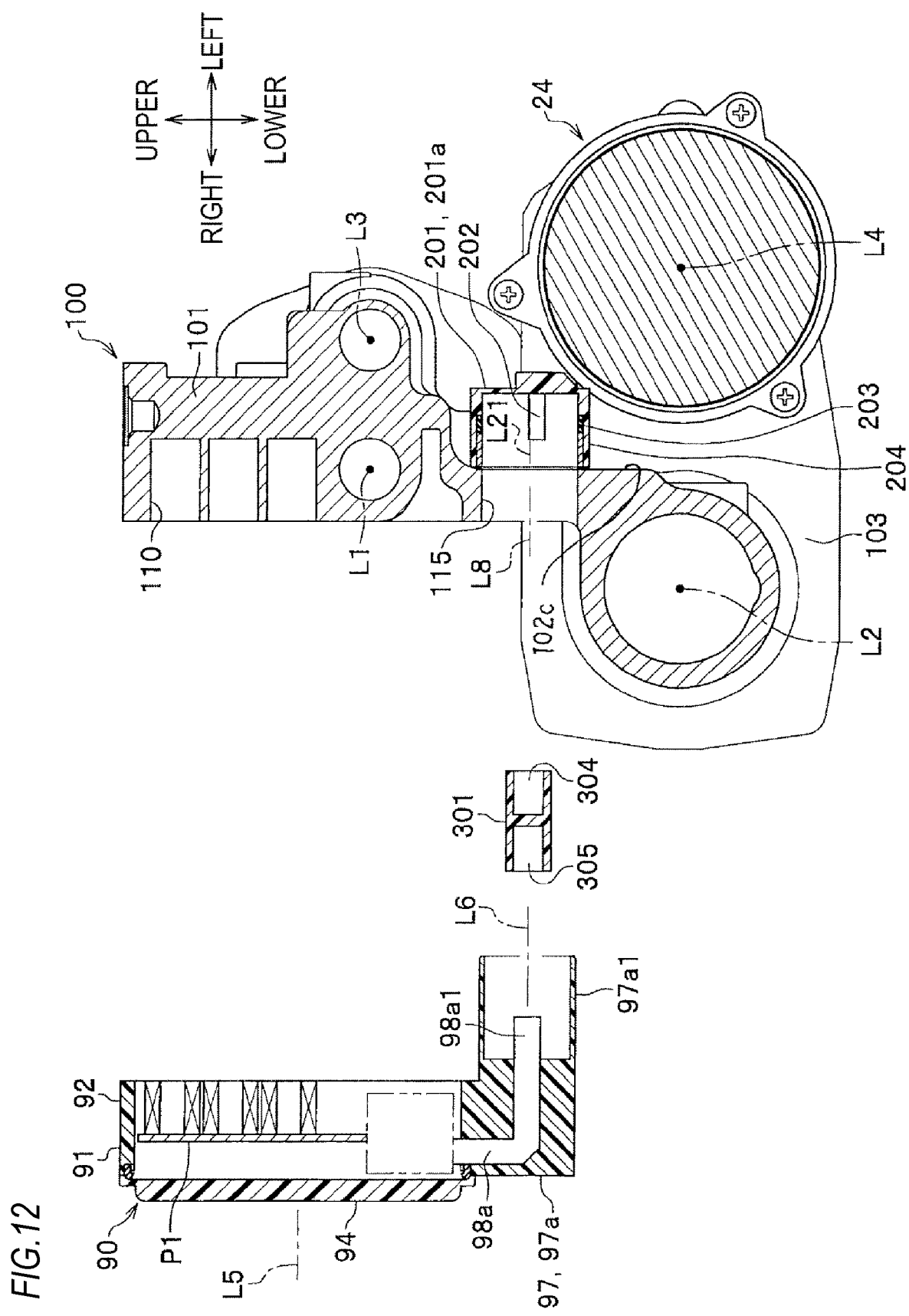
FIG. 12 is an exploded explanatory view illustrating an assembling procedure.

Inside the motor power connector 201a, motor side power supply terminals 202 protrude in the direction of the cylinder axis L21 as shown in FIG. 12. On the inner surface of the motor power connector 201a, a sealing member 203 is mounted as shown in FIG. 11. The sealing member 203 is held by a cylindrical retainer 205.

Inside the motor control connector 201b, motor side control terminals (not shown in the drawings) protrude in the direction of the cylinder axis L22. On the inner surface of the motor control connector 201b, similarly, a sealing member 203 (not shown in the drawings) is mounted. This sealing member 203 is also held by a cylindrical retainer 205 (not shown in the drawings).

The drive transmission unit 25 is a mechanism for converting a rotation drive force of the output shaft 24a of the motor 24 into an axial force of a straight line direction.

The drive transmission unit 25 includes a rod 25a, a cylindrical nut member 25b fit on the rod 25a, a driven pulley 25c fit on the nut member 25b, an endless belt 25d suspended between the driven pulley 25c and the driving pulley 24b, and a cover member 25e.

The rod 25a is inserted from the opening 21b of the second cylinder bore 21 into the second cylinder bore 21, such that the front end portion of the rod 25a comes into contact with the second piston 22. The rear portion of the rod 25a protrudes from the rear surface 102b of the base body 100 toward the rear side.

Between the outer circumferential surface of the rear portion of the rod 25a and the inner circumferential surface of the nut member 25b, a ball screw mechanism is provided. Also, the nut member 25b is fixed to the base body 100 with a bearing interposed therebetween.

If the output shaft 24a rotates, the rotation drive force of the output shaft is input to the nut member 25b by the driving pulley 24b, the belt 25d, and the driven pulley 25c. Then, the ball screw mechanism provided between the nut member 25b and the rod 25a applies the axial force of the straight line direction to the rod 25a, whereby the rod 25a moves forward and backward in the front-rear direction.

When the rod 25a moves forward, the second piston 22 slides inside the second cylinder bore 21 in response to the input from the rod 25a, thereby pressing the brake fluid contained in the pressure chamber 26.

Now, the hydraulic passages formed in the base body 100 will be described.

As shown in FIG. 1, two main hydraulic passages 2a and 2b are hydraulic passages starting from the first cylinder bore 11 of the master cylinder 10.

The first main hydraulic passage 2a extends from the bottom side pressure chamber 16a of the master cylinder 10 to two wheel brakes BR and BR through the hydraulic pressure control device 30.

The second main hydraulic passage 2b extends from the opening side pressure chamber 16b of the master cylinder 10 to the other two wheel brakes BR and BR through the hydraulic pressure control device 30.

The hydraulic branch passage 3 is a hydraulic passage extending from the pressure chamber 45 of the stroke simulator 40 to the second main hydraulic passage 2b. On the hydraulic branch passage 3, a normally closed type solenoid valve 8 is provided. The normally closed type solenoid valve 8 is for opening or closing the hydraulic branch passage 3.

Two connection passages 5a and 5b start from the second cylinder bore 21 of the slave cylinder 20. The two connection passages 5a and 5b are connected to the second cylinder bore 21 by a common hydraulic passage 4.

The first connection passage 5a is a flow passage extending from the pressure chamber 26 formed inside the second cylinder bore 21 to the first main hydraulic passage 2a, and the second connection passage 5b is a flow passage extending from the pressure chamber 26 to the second main hydraulic passage 2b.

On the connection part of the first main hydraulic passage 2a and the first connection passage 5a, a first changeover valve 51 which is a three-way valve is provided. The first changeover valve 51 is a two-position three-port type solenoid valve.

When the first changeover valve 51 is at a first position shown in FIG. 1, the upstream side of the first main hydraulic passage 2a (close to the master cylinder 10) and the downstream side thereof (close to the wheel brakes BR) are connected, and the first main hydraulic passage 2a and the first connection passage 5a are disconnected.

When the first changeover valve 51 is at a second position, the upstream side and downstream side of the first main hydraulic passage 2a are disconnected, and the first connection passage 5a and the downstream side of the first main hydraulic passage 2a are connected.

On the connection portion of the second main hydraulic passage 2b and the second connection passage 5b, a second changeover valve 52 which is a three-way valve is provided. The second changeover valve 52 is a two-position three-port type solenoid valve.

When the second changeover valve 52 is at a first position shown in FIG. 1, the upstream side of the second main hydraulic passage 2b (close to the master cylinder 10) and the downstream side thereof (close to the wheel brakes BR) are connected, and the second main hydraulic passage 2b and the second connection passage 5b are disconnected.

When the second changeover valve 52 is at a second position, the upstream side and downstream side of the second main hydraulic passage 2b are disconnected, and the second connection passage 5b and the downstream side of the second main hydraulic passage 2b are connected.

On the first connection passage 5a, a first shutoff valve 61 is provided. The first shutoff valve 61 is a normally open type solenoid valve. If electric power is supplied to the first shutoff valve 61, whereby the first shutoff valve is closed, the first connection passage 5a is blocked by the first shutoff valve 61.

On the second connection passage 5b, a second shutoff valve 62 is provided. The second shutoff valve 62 is a normally open type solenoid valve. If electric power is supplied to the second shutoff valve 62, whereby the second shutoff valve is closed, the second connection passage 5b is blocked by the second shutoff valve 62.

Two pressure sensors 6 and 7 are for detecting the magnitude of the brake hydraulic pressure, and information acquired by the two pressure sensors 6 and 7 is output to the electronic control device 90.

The first pressure sensor 6 is disposed on the upstream side from the first changeover valve 51, and detects the brake hydraulic pressure generated by the master cylinder 10.

The second pressure sensor 7 is disposed on the downstream side from the second changeover valve 52. When the two connection passages 5a and 5b and the downstream sides of the two main hydraulic passages 2a and 2b are connected, the second pressure sensor detects the brake hydraulic pressure generated by the slave cylinder 20.

A supply passage 73 for the slave cylinder is a fluid passage extending from the reservoir tank 80 to the slave cylinder 20. Also, the supply passage 73 for the slave cylinder is connected to the common hydraulic passage 4 by a branch supply passage 73a.

On the branch supply passage 73a, a check valve 73b is provided to allow only a flow of the brake fluid from the reservoir tank 80 toward the common hydraulic passage 4.

Normally, the brake fluid is supplied from the reservoir tank 80 to the slave cylinder 20 through the supply passage 73 for the slave cylinder.

Also, during fluid suction control, the brake fluid is sucked from the reservoir tank 80 into the slave cylinder 20 through the supply passage 73 for the slave cylinder, the branch supply passage 73a, and the common hydraulic passage 4.

A return fluid passage 74 is a fluid passage extending from the hydraulic pressure control device 30 to the reservoir tank 80. The brake fluid released from the wheel cylinders W flows into the return fluid passage 74 through the hydraulic pressure control device 30. The brake fluid released into the return fluid passage 74 returns to the reservoir tank 80 through the return fluid passage 74.

The hydraulic pressure control device 30 is for appropriately controlling the hydraulic pressure of the brake fluid to act on the wheel cylinders W of the wheel brakes BR. The hydraulic pressure control device 30 has a configuration capable of performing antilock brake control. The wheel cylinders W are connected to outlet ports 31a of the base body 100 by pipes, respectively.

The hydraulic pressure control device 30 can increase, hold, or decrease the hydraulic pressure (hereinafter, referred to as the "wheel cylinder pressure") to act on the wheel cylinders W. The hydraulic pressure control device 30 includes inlet valves 31, outlet valves 32, and check valves 33.

The inlet valves 31 are disposed on two hydraulic passages extending from the first main hydraulic passage 2a to two wheel brakes BR and BR and two hydraulic passages extending from the second main hydraulic passage 2b to two wheel brakes BR and BR, on a one-to-one basis, respectively.

The inlet valves 31 are normally opened type proportional solenoid valves (linear solenoid valves), and are valves configured such that it is possible to adjust valve opening pressures of the inlet valves 31 according to the values of currents flowing in coils of the inlet valves 31.

Normally, since the inlet valves 31 are open, they allow the hydraulic pressure to be applied from the slave cylinder 20 to the wheel cylinders W. Also, when the wheels are about to be locked, the inlet valves 31 are closed by control of the electronic control device 90, whereby application of the hydraulic pressure to the wheel cylinders W is interrupted.

The outlet valves 32 are normally closed type solenoid valves disposed between the wheel cylinders W and the return fluid passage 74.

Although the outlet valves 32 are normally closed, when the wheels are about to be locked, the outlet valves are opened by control of the electronic control device 90.

The check valves 33 are connected in parallel to the inlet valves 31, respectively. The check valves 33 are valves allowing only flows of the brake fluid from the wheel cylinders W toward the slave cylinder 20 (the master cylinder 10). Therefore, even when the inlet valves 31 are closed, the check valves 33 allow flows of the brake fluid from the wheel cylinders W toward the slave cylinder 20.

The electronic control device 90 includes a housing 91 which is a resin box, and a control board (not shown in the drawings) contained in the housing 91. As shown in FIG. 2, the housing 91 is attached to a right surface 101*d* of the base body 100. The housing 91 will be described in detail.

As shown in FIG. 1, the electronic control device 90 controls an operation of the motor 24 and opening and closing of each valve, on the basis of information acquired from various sensors such as the two pressure sensors 6 and 7 and a stroke sensor (not shown in the drawings), programs stored in advance, and so on.

Now, an operation of the brake system 1A for a vehicle will be described in brief.

In the brake system 1A for a vehicle shown in FIG. 1, if the system is activated, the two changeover valves 51 and 52 are excited, thereby being switched from the first positions to the second positions.

As a result, the downstream side of the first main hydraulic passage 2*a* is connected to the first connection passage 5*a*, and the downstream side of the second main hydraulic passage 2*b* is connected to the second connection passage 5*b*. Therefore, the master cylinder 10 and the wheel cylinders W are disconnected, and the slave cylinder 20 and the wheel cylinders W are connected.

Also, if the system is activated, the normally closed type solenoid valve 8 of the hydraulic branch passage 3 is opened. As a result, the hydraulic pressure generated by the master cylinder 10 in response to an operation on the brake pedal P is transmitted to the stroke simulator 40, without being transmitted to the wheel cylinders W.

Therefore, the hydraulic pressure of the pressure chamber 45 of the stroke simulator 40 increases, whereby the third piston 42 moves toward the lid member 44 against the biasing forces of the coil springs 43*a* and 43*b*. In this way, a stroke on the brake pedal P is allowed, and a pseudo operation reaction force is applied to the brake pedal P.

Also, if the stroke sensor (not shown in the drawings) detects depression of the brake pedal P, the electronic control device 90 drives the motor 24 of the slave cylinder 20, whereby the second piston 22 of the slave cylinder 20 moves toward the bottom surface 21*a*. As a result, the brake fluid contained in the pressure chamber 26 is pressed.

The electronic control device 90 compares the hydraulic pressure generated by the slave cylinder 20 (the hydraulic pressure detected by the second pressure sensor 7) with a requirement hydraulic pressure corresponding to the amount of operation on the brake pedal P, and controls the rotation speed of the motor 24 on the basis of the comparison result.

In this way, the brake system 1A for a vehicle increases the hydraulic pressure in response to the amount of operation on the brake pedal P. Also, the hydraulic pressure generated by the slave cylinder 20 is applied to the hydraulic pressure control device 30.

If depression of the brake pedal P is released, the electronic control device 90 reversely rotates the motor 24 of the slave cylinder 20, whereby the second piston 22 is moved back toward the motor 24 by the coil spring 23. As a result, the internal pressure of the pressure chamber 26 decreases.

Also, in a case where a detection value of the second pressure sensor 7 does not increase to a determination value although the motor 24 of the slave cylinder 20 rotates, the electronic control device 90 closes the two shutoff valves 61 and 62, and drives the slave cylinder 20 such that the slave cylinder 20 increases the hydraulic pressure.

Even then, if the detection value of the second pressure sensor 7 does not increase, since there is a possibility that the brake fluid is leaking from any passage positioned on the slave cylinder 20, the electronic control device 90 controls the individual valves such that the hydraulic pressure directly acts from the master cylinder 10 on the wheel cylinders W.

Also, when the two shutoff valves 61 and 62 are closed, and the slave cylinder 20 operates to increase the hydraulic pressure, if the detection value of the second pressure sensor 7 increases, the electronic control device 90 closes the first shutoff valve 61, and opens the second shutoff valve 62, and drives the slave cylinder 20 such that the slave cylinder increases the hydraulic pressure.

As a result, if the detection value of the second pressure sensor 7 increases, since there is a possibility that the brake fluid would be leaking from the first main hydraulic passage 2*a*, the electronic control device 90 keeps on driving the slave cylinder 20 such that the hydraulic pressure in the second main hydraulic passage 2*b* increases.

Meanwhile, even if the first shutoff valve 61 is closed and the second shutoff valve 62 is opened and the slave cylinder 20 operates to increase the hydraulic pressure, if the detection value of the second pressure sensor 7 does not increase, the electronic control device 90 opens the first shutoff valve 61, and closes the second shutoff valve 62, and drives the slave cylinder 20 such that the hydraulic pressure increases.

As a result, in a case where the detection value of the second pressure sensor 7 increases, since there is a possibility that the brake fluid is leaking from the second main hydraulic passage 2*b*, the electronic control device 90 keeps on driving the slave cylinder 20 such that the hydraulic pressure in the first main hydraulic passage 2*a* increases.

In the hydraulic pressure control device 30, the electronic control device 90 controls the open/closed states of the inlet valves 31 and the outlet valves 32, whereby the wheel cylinder pressure of the wheel cylinders W are adjusted.

For example, in a normal state in which the inlet valves 31 are open and the outlet valves 32 are closed, if the brake pedal P is depressed, the hydraulic pressure generated by the slave cylinder 20 is transmitted to the wheel cylinders W without change, whereby the wheel cylinder pressure increases.

Meanwhile, in a state in which the inlet valves 31 are closed and the outlet valves 32 are open, the brake fluid flows from the wheel cylinders W toward the return fluid passage 74, whereby the wheel cylinder pressure decreases, whereby the hydraulic pressure decreases.

Also, in a state in which all of the inlet valves 31 and the outlet valves 32 are closed, the wheel cylinder pressure is held.

Also, in a state where the slave cylinder 20 does not operate (for example, in a case where an ignition is in an OFF state or electric power is not supplied), the first changeover valve 51, the second changeover valve 52, and the normally closed type solenoid valve 8 return to their initial states. As a result, the upstream side and downstream side of each of the main hydraulic passages 2*a* and 2*b* are connected. In this state, the hydraulic pressure generated by the master cylinder 10 is transmitted directly to the wheel cylinders W through the hydraulic pressure control device 30.

Now, the arrangement of the master cylinder 10, the slave cylinder 20, the stroke simulator 40, the hydraulic pressure control device 30, and the electronic control device 90 included in the hydraulic pressure generating device 1 of the present embodiment will be described.

Also, in the following description, the arrangement of those devices in a state where the hydraulic pressure generating device 1 is mounted on a vehicle will be described.

An upper portion 101 of the base body 100 of the present embodiment is formed substantially in a cuboid shape as shown in FIGS. 2 and 3. In the upper portion 10, the first cylinder bore 11 and the third cylinder bore 41 are formed as shown in FIG. 7. On the upper surface 101*e* of the upper portion 101, the reservoir tank 80 is attached as shown in FIGS. 2 and 3. The upper portion 101 corresponds to a "main body part of a base body" of claims.

Figure 5:
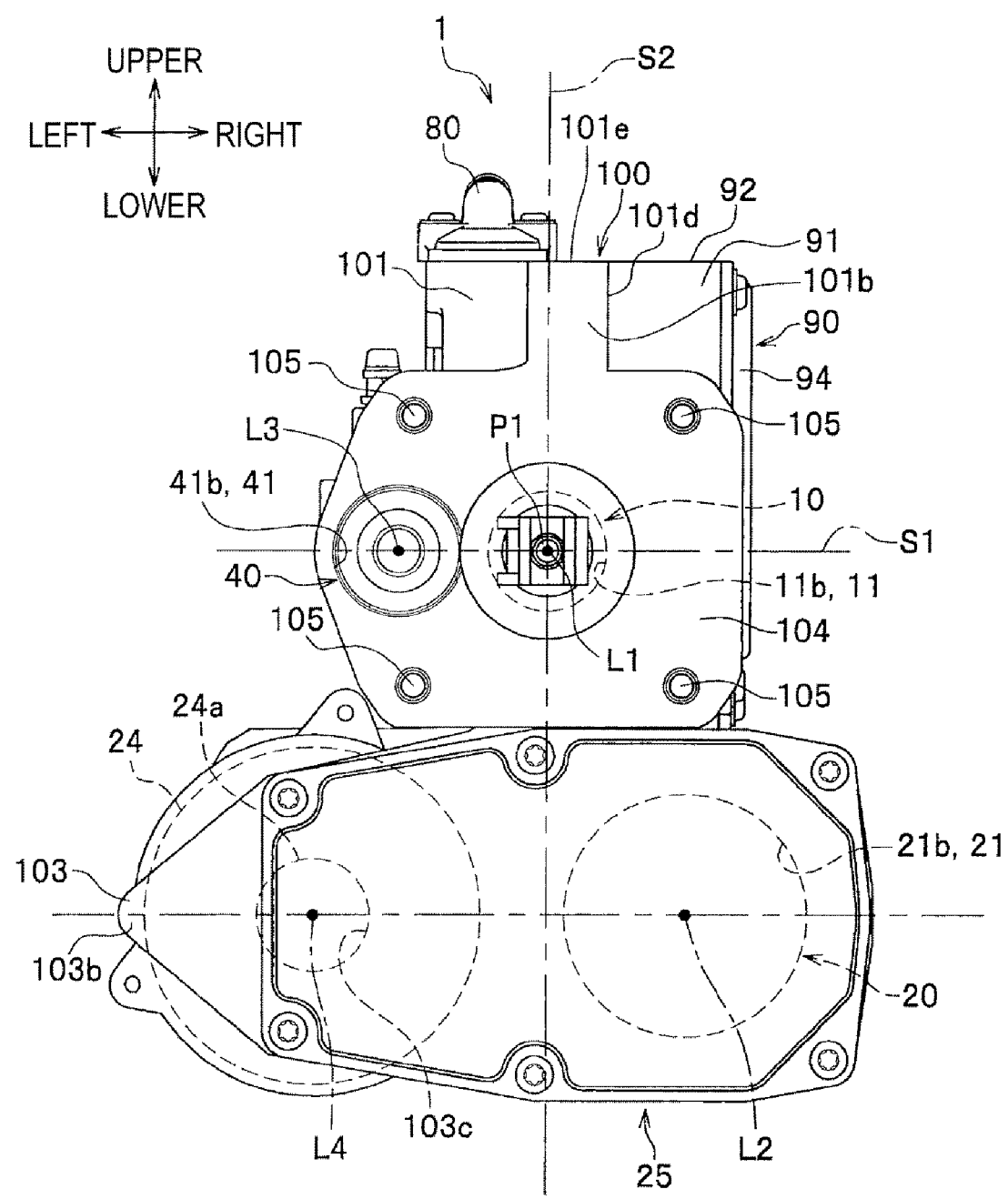
FIG. 5 is a rear view illustrating the hydraulic pressure generating device of the embodiment.

At the central portion of the upper portion 101 of the base body 100 in a vertical direction and the left-right direction, as shown in FIG. 5, the first cylinder bore 11 of the master cylinder 10 is formed.

The first cylinder bore 11 is a cylindrical bore with a bottom. The axial line L1 of the first cylinder bore 11 extends in the front-rear direction as shown in FIG. 7. The rear end portion of the first cylinder bore 11 is formed in the rear surface 101*b* of the upper portion 101. In other words, the first cylinder bore 11 is open toward the rear side.

The rear surface 101*b* of the upper portion 101 of the base body 100 has a vehicle contact surface 104 as shown in FIG. 4. The vehicle contact surface 104 is a portion to be attached to the front surface of a dashboard B partitioning an engine room and the interior of the vehicle.

At the central portion of the vehicle contact surface 104, the opening 11*b* of the first cylinder bore 11 is formed as shown in FIG. 5. Also, from four corners of the vehicle contact surface 104, that is, the upper, lower, left, and right thereof, four stud bolts 105 protrude.

When the base body 100 is attached to the dashboard B, as shown in FIG. 4, the stud bolts 105 are inserted from the engine side (the left side of FIG. 4) into mounting holes (not shown in the drawings) of the dashboard B. Further, inside the vehicle (the right side of FIG. 4), the leading end portions of the stud bolts 105 are attached to the vehicle frame (not shown in the drawings). In this way, it is possible to fix the base body 100 to the front surface of the dashboard B.

Figure 6:
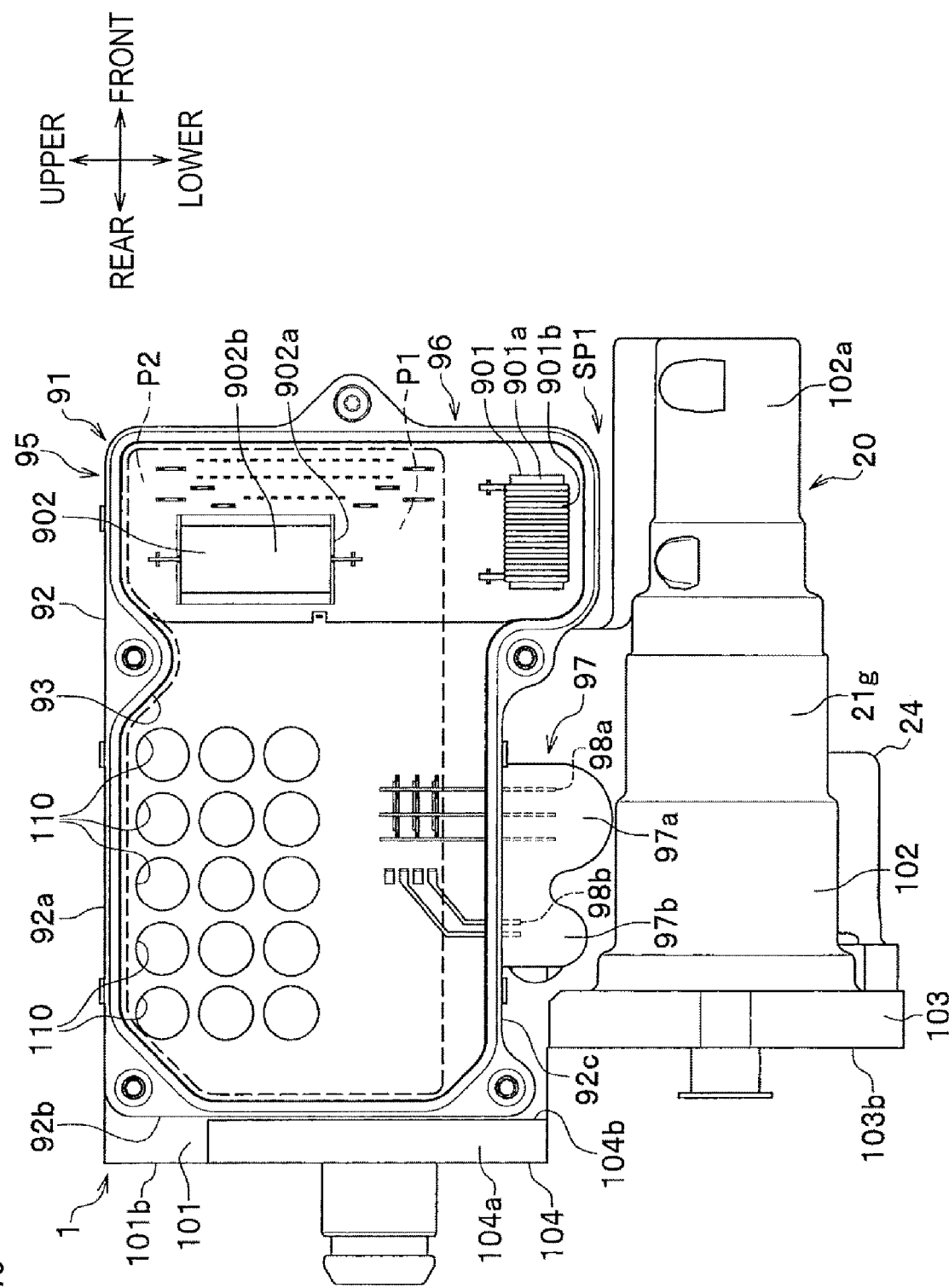
FIG. 6 is a right side view illustrating the positional relation between an arrangement of main components of a housing of the hydraulic pressure generating device of the embodiment and a slave cylinder.

In a portion of the upper portion 101 of the base body 100 positioned on the left side from the first cylinder bore 11, as shown in FIG. 5, the third cylinder bore 41 of the stroke simulator 40 is formed (see FIG. 6).

The third cylinder bore 41 is a cylindrical bore with a bottom. As shown in FIG. 7, the axial line L3 of the third cylinder bore 41 extends in the front-rear direction.

The axial line L3 of the third cylinder bore 41 is parallel to the axial line L1 of the first cylinder bore 11. Like this, the first cylinder bore 11 and the third cylinder bore 41 are disposed side by side in parallel.

As shown in FIG. 5, the axial line L3 of the third cylinder bore 41 and the axial line L1 of the first cylinder bore 11 are arranged side by side in the left-right direction on a horizontal reference plane S1 (a virtual plane).

A gap between the first cylinder bore 11 and the third cylinder bore 41 is set so as to be smaller than the radius of the first cylinder bore 11, and the first cylinder bore 11 and the third cylinder bore 41 are adjacent to each other in the left-right direction. Also, the diameter of the first cylinder bore 11 is set so as to be smaller than the diameter of the third cylinder bore 41.

The third cylinder bore 41 is formed in the rear surface 101*b* of the upper portion 101 of the base body 100. In other words, the third cylinder bore 41 is open toward the rear side.

An almost half left portion of the peripheral wall portion of the third cylinder bore 41 protrudes from a left surface 101*c* of the upper portion 101 toward the left side as shown in FIG. 3.

As shown in FIG. 7, a lower portion 102 of the base body 100 is formed to be connected to the upper portion 101. In the lower portion 102 of the base body 100, as shown in FIGS. 4 and 7, the second cylinder bore 21 of the slave cylinder 20 is formed.

The second cylinder bore 21 is a cylindrical bore with a bottom. As shown in FIG. 7, the axial line L2 of the second cylinder bore 21 extends in the front-rear direction.

As shown in FIG. 5, the second cylinder bore 21 is disposed on the lower side from the first cylinder bore 11 and the third cylinder bore 41, and the second cylinder bore 21 is disposed on the diagonally right lower side.

The rear surface 102*b* of the lower portion 102 is positioned on the front side from the rear surface 101*b* (the vehicle contact surface 104) of the upper portion 101 with an offset as shown in FIG. 7. Also, a front portion 102*a* of the lower portion 102 protrudes from a front surface 101*a* of the upper portion 101 toward the front side. The front portion 102*a* corresponds to a "slave cylinder extension pan" of claims.

Figure 8A:
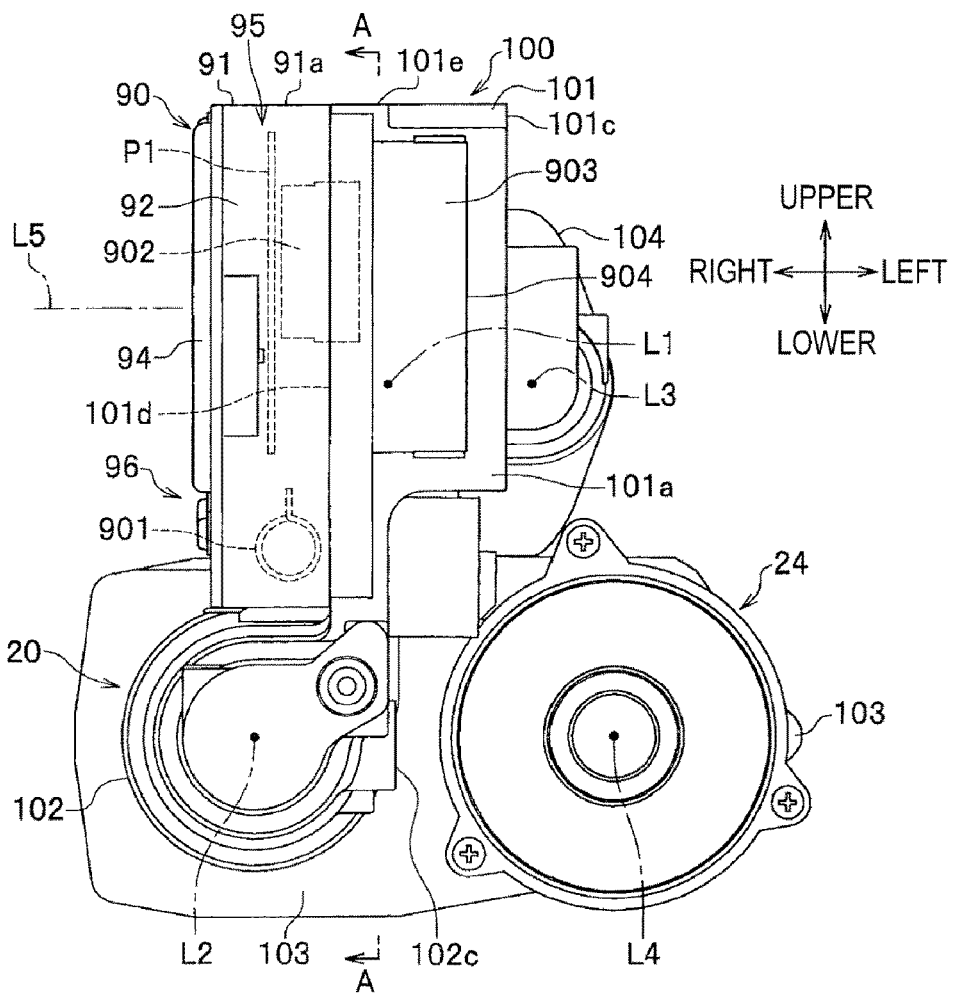
FIG. 8A is a front view illustrating the hydraulic pressure generating device of the embodiment.

As shown in FIG. 8A, a peripheral wall portion 21*g* forming the second cylinder bore 21 protrudes from the right surface 101*d* of the upper portion 101 toward the right side. Also, the left surface 102*c* of the lower portion 102 is formed so as to be flat. The left surface 102*c* is disposed on the right side from the left surface 101*c* of the upper portion 101 with an offset. This offset space is used to dispose the motor 24 on the left side of the left surface 102*c*.

The peripheral wall portion 21*g* is formed in such a tapered shape that its diameter gradually decreases as it goes toward the front portion 102*a* of the lower portion 102 as shown in FIG. 7. This tapered shape of the peripheral wall portion 21*g* causes a space SP1 to be formed above the front portion 102*a* of the lower portion 102 (see FIG. 6).

As shown in FIG. 7, the axial line L2 of the second cylinder bore 21 is parallel to the axial line L1 of the first cylinder bore 11 and the axial line L3 of the third cylinder bore 41. Like this, the first cylinder bore 11, the second cylinder bore 21, and the third pattern area 23 are arranged side by side in parallel.

The second cylinder bore 21 is formed in the rear surface 102*b* of the lower portion 102 of the base body 100. In other words, the second cylinder bore 21 is open toward the rear side.

In the rear end portion of the lower portion 102 of the base body 100, as shown in FIG. 5, the flange portion 103 is formed so as to protrude toward the left side. The flange portion 103 is a plate-like portion perpendicularly protruding from a left surface 102*c* of the lower portion 102 (see FIG. 7).

As shown in FIG. 4, the front surface of the flange portion 103 is the motor mounting surface 103a for mounting the motor 24. Also, the rear surface of the flange portion 103 is a drive-transmission-unit mounting surface 103b for mounting the drive transmission unit 25.

The drive-transmission-unit mounting surface 103b of the flange portion 103 is formed so as to be connected to the rear surface 102b of the lower portion 102 on the same plane. Further, similarly to the rear surface 102b of the lower portion 102, the drive-transmission-unit mounting surface 103b is disposed on the front side from the rear surface 101b of the upper portion 101 with an offset. In other words, the drive-transmission-unit mounting surface 103b is disposed on the front side from the vehicle contact surface 104 of the upper portion 101.

On the motor mounting surface 103a of the flange portion 103, the motor 24 is attached. The front end surface of the motor 24 is disposed on the rear side from the front surface 101a of the upper portion 101 of the base body 100. The motor 24 is disposed at a position close to the center of the base body 100 in the front-rear direction and the left-right direction.

In the flange portion 103, an insertion hole 103c is formed in the front-rear direction. The output shaft 24a protruding from the rear surface of the motor 24 toward the rear side is inserted into the insertion hole 103c so as to protrude from the drive-transmission-unit mounting surface 103b toward the rear side through the insertion hole 103c.

As shown in FIG. 5, the insertion hole 103c of the flange portion 103 is disposed on the lower side from the first cylinder bore 11 and the third cylinder bore 41 and on the diagonally left lower side from the first cylinder bore 11.

Therefore, if the motor 24 is attached to the flange portion 103, the output shaft 24a is disposed on the lower side from the first cylinder bore 11 and the third cylinder bore 41 and on the diagonally left lower side from the first cylinder bore 11.

In a state where the motor 24 is mounted on the flange portion 103, as shown in FIG. 4, an axial line L4 of the output shaft 24a extends in the front-rear direction.

The axial line L4 of the output shaft 24a is parallel to the axial lines L1, L2, and L3 of the cylinder bores 11, 21, and 41. Like this, the cylinder bores 11, 21, and 41 and the output shaft 24a are disposed side by side in parallel.

Also, as shown in FIG. 5, the axial line L4 of the output shaft 24a and the axial line L2 of the second cylinder bore 21 are disposed side by side in the left-right direction.

As shown in FIG. 1, on the rear surface 102b of the lower portion 102 of the base body 100 and the drive-transmission-unit mounting surface 103b of the flange portion 103, components of the drive transmission unit 25 are assembled.

As shown in FIG. 4, the offsets of the rear surface 102b of the lower portion 102 and from the drive-transmission-unit mounting surface 103b of the flange portion 103 from the vehicle contact surface 104 toward the front side are set such that the rear end portion of the cover member 25e of the drive transmission unit 25 does not protrude from the vehicle contact surface 104 of the upper portion 101 toward the rear side.

Therefore, when the vehicle contact surface 104 of the base body 100 is mounted on the dashboard B, the drive transmission unit 25 is positioned between the front surface of the dashboard B and the drive-transmission-unit mounting surface 103b of the flange portion 103 of the base body 100.

In the right surface 101d of the upper portion 101 of the base body 100, as shown in FIG. 7, a plurality of mounting holes 110 for mounting the various valves 51, 52, 61, 62, 8, 31, and 32 (see FIG. 1) and the two pressure sensors 6 and 7 (see FIG. 1) is formed.

Also, in the connection part of the upper portion 101 and the lower portion 102 of the base body 100, two through-holes, that is, a large connector hole 115 and a small connector hole 116 are formed in the left-right direction. Axial lines L15 and L16 of the connector holes 115 and 116 are perpendicular to the axial lines L1, L2, and L3 of the cylinder bores 11, 21, and 41.

On the right surface 101d of the upper portion 101, the housing 91 of the electronic control device 90 is attached as shown in FIG. 2. The various valves 51, 52, 61, 62, 8, 31, and 32 (see FIG. 1) and the two pressure sensors 6 and 7 (see FIG. 1) mounted in the mounting holes 110 (see FIG. 7) are covered by the housing 91.

The housing 91 is disposed on the second cylinder bore 21. Like this, the housing 91 and the slave cylinder 20 are disposed on the right side of the upper portion 101 of the base body 100, side by side in the vertical direction. In other words, as shown in FIG. 5, the housing 91 and the slave cylinder 20 are disposed on one side (the right side) of a vertical reference plane S2 (a virtual plane) including the axial line L1 of the first cylinder bore 11.

Also, as shown in FIG. 5, the second cylinder bore 21 and the motor 24 (the output shaft 24a) are disposed below the horizontal reference plane S1 (the virtual plane) including the axial line L1 of the first cylinder bore 11 and the axial line L3 of the third cylinder bore 41.

Also, the third cylinder bore 41 and the motor 24 (the output shaft 24a) are disposed on the left side from the vertical reference plane S2 (the virtual plane) including the axial line L1 of the first cylinder bore 11. Further, the second cylinder bore 21 is disposed on the right side from the vertical reference plane S2 including the axial line L1 of the first cylinder bore 11. In other words, as shown in FIG. 5, the housing 91 and the motor 24 are disposed on one side (the right side) and the other side (the left side) of the vertical reference plane S2 (the virtual plane) including the axial line L1 of the first cylinder bore 11.

As described above, in the hydraulic pressure generating device 1, below the first cylinder bore 11, the second cylinder bore 21 and the motor 24 are disposed on the right and left of the vertical reference plane S2 including the axial line L1 of the first cylinder bore 11, respectively.

Therefore, as the hydraulic pressure generating device 1 is seen from the front-rear direction, the center point of the first cylinder bore 11 (the axial line L1), the center point of the second cylinder bore 21 (the axial line L2), and the center point of the output shaft 24a (the axial line L4) are disposed such that a line connecting them forms a triangle. In other words, as the hydraulic pressure generating device 1 is seen from the front-rear direction, the first cylinder bore 11 (the master cylinder 10) is disposed at the apex of the triangle, and the second cylinder bore 21 (the slave cylinder 20) and the output shaft 24a (the motor 24) are disposed at the left and right ends of the base of the triangle.

As shown in FIG. 2, the housing 91 is formed substantially in a rectangular shape long in the direction of the axial line L2 of the slave cylinder 20. The housing 91 has an annular peripheral wall portion 92, and a lid part 94 configured to an opening 93 (see FIG. 6) of the peripheral wall portion 92. An axial line L5 of the peripheral wall portion 92 is perpendicular to the axial lines L1, L2, and L3 of the cylinder bores 11, 21, and 41.

The housing 91 has a housing protrusion portion 95 protruding toward the front side from the front surface 101a of the base body 100 in the protruding direction of the slave cylinder 20 (see FIG. 3). As shown in FIG. 8A, the housing protrusion portion 95 protrudes toward the left side from the right surface 101d (a housing mounting surface) of the base body 100. In other words, in order to use a front space from the base body 100, the housing protrusion portion 95 is formed so as to have a larger thickness in the left-right direction as compared to the other portion of the housing 91 (the portion to be disposed on the right surface 101d of the base body).

On the left surface of the housing protrusion portion 95, an external connection connector 903 is provided.

Figure 8B:
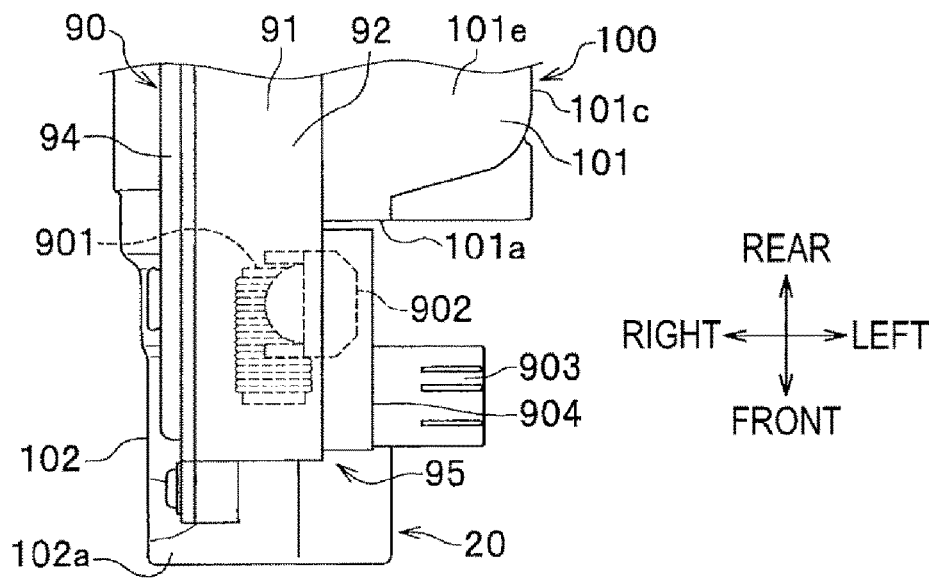
FIG. 8B is a plan view illustrating a portion of the front portion of the hydraulic pressure generating device of the embodiment.

Inside the housing protrusion portion 95, as shown in FIGS. 6, 8A, and 8B, a capacitor 902 and a choke coil 901 functioning as a noise filter are disposed.

The choke coil 901 and the capacitor 902 are for reducing noise occurring between signal lines and between power supply lines in electronic circuits of a control board P1. The choke coil 901 and the capacitor 902 have predetermined external diameters in the left-right direction (thickness direction) of the housing protrusion portion 95, respectively, and are contained in an accommodating space formed inside the housing protrusion portion 95.

The choke coil 901 has a core 901a, and conductive wire 901b wound on the core 901a. The core 901a is a magnetic iron core for a coil, and is formed in a columnar shape. In the present embodiment, the axial line direction of the core 901a is disposed in the front-rear direction. The conductive wire 901b is wound over the range between both end portions of the core 901a.

As shown in FIG. 6, the choke coil 901 is contained in a lower end portion 96 of the housing protrusion portion 95. The lower end portion 96 protrudes downward from a lower surface 92c of the peripheral wall portion 92. The lower end portion 96 extends toward the space SP1 above the front portion 102a of the base body 100. In other words, the choke coil 901 is disposed in the space SP1 formed due to the tapered shape of the slave cylinder 20.

The capacitor 902 has a case 902a, and a main capacitor body 902b contained in the case 902a. In the present embodiment, the axial line direction of the capacitor 902 is disposed in the vertical direction. The capacitor 902 has an upper terminal and a lower terminal. Each terminal extends in the vertical direction.

The capacitor 902 is disposed at an upper portion of the housing protrusion portion 95. As shown in FIG. 8A, the capacitor 902 is disposed between the control board P1 and the external connection connector 903, and a portion of the capacitor close to the opening 93 is covered by the control board P1.

The external connection connector 903 is a part to be connected with a connector provided at an end portion of an external wiring cable (not shown in the drawings). In front of the front surface 101a of the upper portion 101, the external connection connector 903 extends toward the left side.

Also, as shown in FIGS. 8A and 8B, the left end portion of the external connection connector 903 is positioned on the right side from the left surface 101c of the base body 100, and is configured such that at least a portion of an external connector (not shown in the drawings) is fit thereto in front of the front surface 101a of the base body 100.

Inside the housing 91, as shown in FIG. 6, the control board P1 (shown by a broken line) is disposed so as to substantially cover the opening 93. The dimension of the control board P1 in the front-rear direction is substantially the same size as that of the inside of the housing 91. The control board P1 has a front portion P2 extending on the housing protrusion portion 95. The front portion P2 of the control board P1 covers the capacitor 902. The capacitor 902 is electrically connected to the control board P1.

As shown in FIG. 2 an upper surface 92a of the peripheral wall portion 92 of the housing 91 is positioned so as to be flush with the upper surface 101e of the base body 100. A rear surface 92b of the peripheral wall portion 92 faces a front surface 104b of a flange portion 104a with a slight gap, as shown in FIG. 6. The lower surface 92c of the peripheral wall portion 92 is disposed with a gap from the peripheral wall portion 21g of the slave cylinder 20 as seen in the right side view. On the lower surface 92c of the peripheral wall portion 92, a housing connector 97 is provided so as to protrude in a curve shape toward the lower side.

Figure 10:
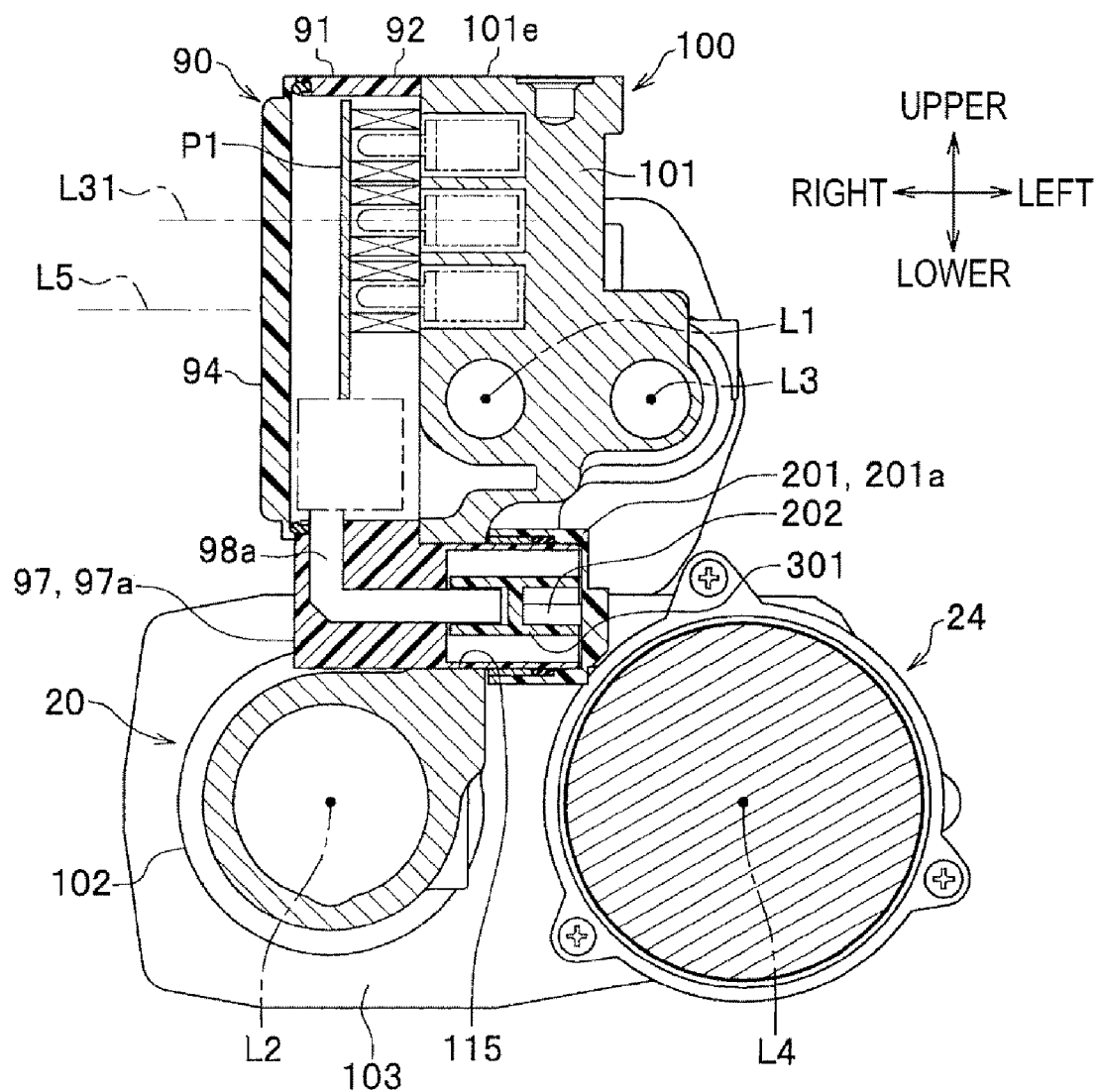
FIG. 10 is a longitudinal cross-sectional view taken along a line B-B of FIG. 9.

The housing connector 97 includes a power supply connector 97a and a control connector 97b. The power supply connector 97a has bus bars 98a for supplying electric power to the motor 24. The control connector 97b has control bus bars 98b for controlling the operation of the motor 24. As shown in FIG. 7, cylinder axes L6 and L7 of the power supply connector 97a and the control connector 97b are disposed in the same direction as (in parallel to) the direction of the cylinder axis L5 of the housing 91 (the peripheral wall portion 92). Also, as shown in FIG. 10, an axial line L31 of an solenoid valve (shown by a broken line in FIG. 10) is also disposed in the same direction as (in parallel to) the direction of the cylinder axis L5 of the housing 91 (the peripheral wall portion 92). Also, the cylinder axes L5, L6, and L7 may be slightly inclined with respect to one another. Also, the axial line L31 and the cylinder axis L5 may be slightly inclined with respect to each other.

Figure 9:
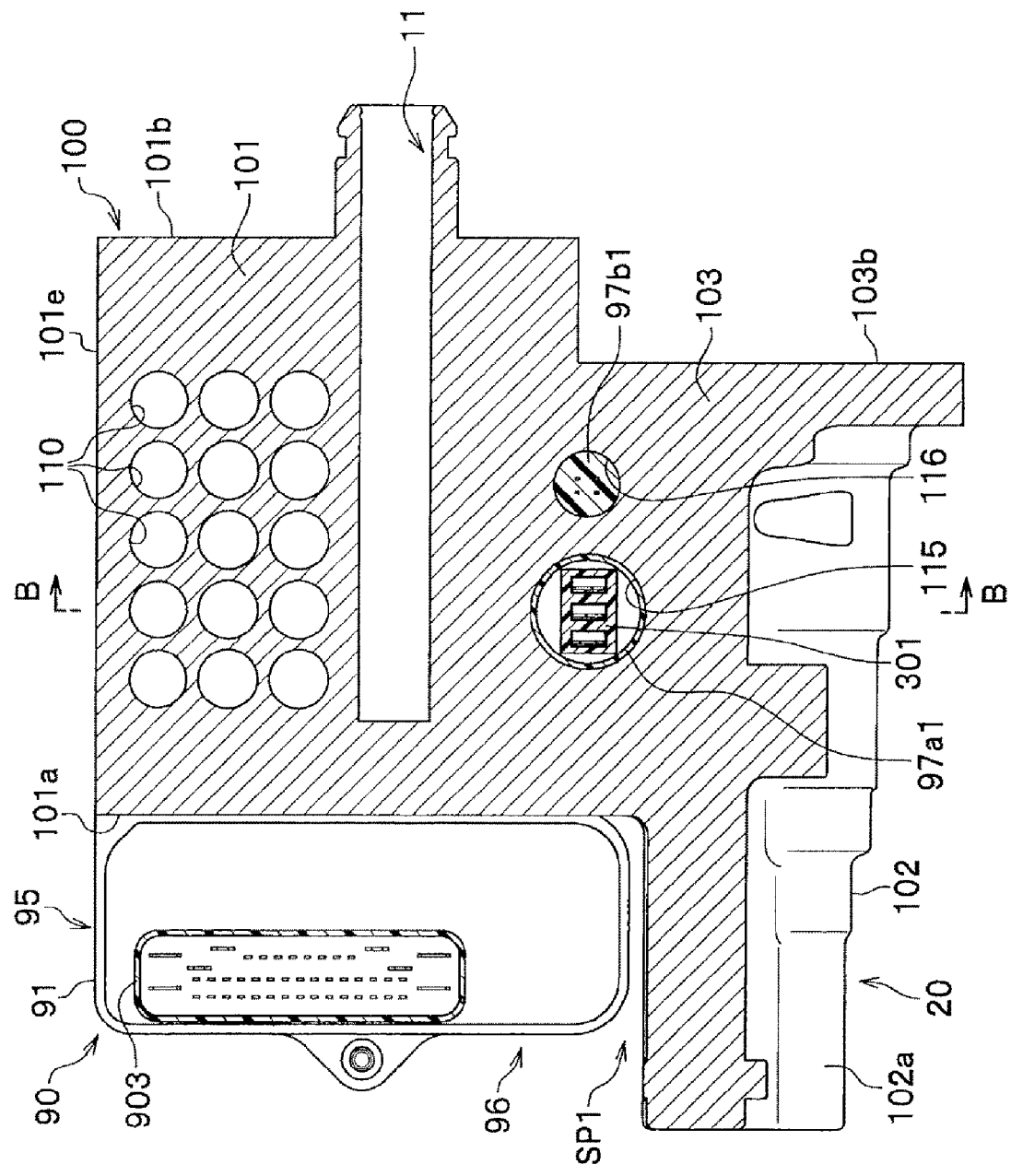
FIG. 9 is a cross-sectional view taken along a line A-A of FIG. 8A with some components omitted.

The power supply connector 97a and the control connector 97b (see FIG. 2) are provided corresponding to the connector holes 115 and 116 (see FIG. 7) of the base body 100. The power supply connector 97a has a cylindrical insertion portion 97a1 (see FIGS. 9 and 12) to be inserted into the connector hole 115. As shown in FIG. 11, the leading end portion of the insertion portion 97a1 protrudes from the left surface 101c of the base body 100 through the connector hole 115.

The control connector 97b has a solid insertion portion 97b1 (see FIG. 9) to be inserted into the connector hole 116. Similarly, the leading end portion of the insertion portion 97b1 also protrudes from the left surface 101c of the base body 100 through the connector hole 116.

As shown in FIG. 12, the cylinder axis L6 of the insertion portion 97a1 is the same axis as an axial line L8 of the connector hole 115. The cylinder axis L7 of the insertion portion 97b1 is the same axis as the axial line (not shown in the drawings) of the connector hole 116.

As shown in FIG. 10, the leading end portion of the power supply connector 97a is inserted into the motor power connector 201a close to the motor 24. The bus bars 98a of the power supply connector 97a are electrically connected to the motor side power supply terminals 202 of the motor power connector 201a by a connection terminal member 301.

As shown in FIG. 11, the connection terminal member 301 has motor side terminal accommodating holes 302 formed close to the motor 24, and housing side terminal accommodating holes 303 formed close to the housing 91. In the motor side terminal accommodating holes 302, terminals 304 to be connected with the motor side power supply terminals 202 are disposed. In the housing side terminal accommodating holes 303, terminals 305 to be connected with leading end portions 98a1 of the bus bars 98*a* of the power supply connector 97*a* are disposed. The terminals 304 and the terminals 305 are conductive. On both sides, three motor side terminal accommodating holes 302 and three housing side terminal accommodating hole 303 are formed, respectively.

Meanwhile, the leading end portion of the control connector 97*b* is inserted into the motor connector 201 close to the motor 24 (not shown in the drawings). The control bus bars 98*b* of the control connector 97*b* are electrically connected to the motor side control terminals (not shown in the drawings) of the motor control connector 201*b*.

As described above, the motor 24 is electrically connected to the control board P1 contained in the housing, through the connector holes 115 and 116 of the base body 100.

Now, assembling of the motor 24 with the base body 100 and assembling of the housing 91 with the base body 100 will be described.

First, the motor 24 is assembled on the motor mounting surface 103*a* of the flange portion 103 from the front side. In this case, as shown in FIG. 12, since the left surface 101*c* of the lower portion 102 of the base body 100 is a flat surface, it is possible to move the motor 24 on the left surface 101*c* along the right portion of the motor connector 201. Therefore, smooth assembling of the motor 24 on the motor mounting surface 103*a* can be implemented.

Thereafter, the motor 24 is fixed to the motor mounting surface 103*a*, and the motor power connector 201*a* of the motor connector 201 is arranged so as to face the opening the connector hole 115 of the base body 100, and the motor control connector 201*b* is arranged so as to face the connector hole 116 of the base body 100.

Thereafter, the connection terminal member 301 is inserted into the connector hole 115 from the right surface 101*d* of the base body 100, whereby the motor side power supply terminals 202 included in the motor power connector 201*a* are connected to the terminals 304 of the connection terminal member 301.

Then, the housing 91 is brought close to the base body 100 from a position close to the right surface 101*d* of the base body 100, and the power supply connector 97*a* of the housing connector 97 is inserted into the connector hole 115 while the control connector 97*b* is inserted into the connector hole 116, whereby the housing 91 is attached to the right surface 101*d*.

Then, the insertion portion 97*a*1 of the power supply connector 97*a* is liquid-tightly installed in the motor power connector 201*a* through the connector hole 115, with the sealing member 203 interposed therebetween. At this time, the leading end portions 98*a*1 of the bus bars 98*a* are inserted into the housing side terminal accommodating holes 303 of the connection terminal member 301, thereby being connected to the terminals 305. As a result, the motor power connector 201*a* and the power supply connector 97*a* are electrically connected by the connection terminal member 301.

Meanwhile, the insertion portion 97*b*1 (see FIG. 9) of the control connector 97*b* is liquid-tightly installed inside the motor control connector 201*b* through the connector hole 116, with the sealing member 203 interposed therebetween (not shown in the drawings). At this time, the leading end portions (not shown in the drawings) of the bus bars 98*b* (see FIG. 6) are connected to the motor side control terminals (not shown in the drawings) of the motor control connector 201*b*. As a result, the motor control connector 201*b* and the control connector 97*b* are electrically connected.

As described above, the motor connector 201 and the housing connector 97 are electrically connected at the shortest distance in the base body 100.

Also, the motor connector 201 and the housing connector 97 are connected by the connection terminal member 301 so as to be slidable in the cylinder axis direction (the left-right direction). Therefore, after assembling of the housing 91, in a case where it is required to adjust the tension of the belt 25*d* of the drive transmission unit 25 (in a case of adjusting the mounting position of the motor 24 in the left-right direction with respect to the flange portion 103), it is possible to appropriately maintain the electrical connection of the motor connector 201 and the housing connector 97. Therefore, it is easy to adjust the tension of the belt 25*d*.

In the hydraulic pressure generating device 1 configured as described above, as shown in FIG. 4, the axial lines L1, L2, and L3 of the cylinder bores 11, 21, and 41 and the axial line L4 of the output shaft 24*a* of the motor 24 are disposed in parallel, such that the cylinder bores 11, 21, and 41 and the motor 24 are disposed with good balance.

According to the hydraulic pressure generating device 1 of the present embodiment, it is possible to collectively dispose the housing 91 and the slave cylinder 20 requiring relatively large installation spaces, on one surface side of the base body 100. Therefore, it becomes easier to secure a space for mounting the hydraulic pressure generating device 1 on a vehicle.

Also, in order to effectively use a space around the base body 100, the housing 91 and the slave cylinder 20 are disposed side by side in the vertical direction. Therefore, the size of the hydraulic pressure generating device 1 decreases.

Also, according to the hydraulic pressure generating device 1 of the present embodiment, it is possible to extend the housing 91 (dispose the housing protrusion portion 95) in a space formed on one side of the base body 100 (a space formed in front of the base body 100) in the protruding direction of the slave cylinder 20 (the direction of the axial line L2). Therefore, it is possible to efficiently secure the capacity of the housing 91.

Also, according to the hydraulic pressure generating device 1 of the present embodiment, due to the tapered shape of the slave cylinder 20, it is possible to appropriately secure the space SP1 for disposing the housing protrusion portion 95 in front of the base body 100, and thus it is possible to reduce the size of the hydraulic pressure generating device.

Also, according to the hydraulic pressure generating device 1 of the present embodiment, since it is possible to store the noise filter requiring a relatively large space for accommodating it, in the housing protrusion portion 95, it is possible to reduce the thickness of the whole of the housing 91. Therefore, it is possible to reduce the size of the hydraulic pressure generating device 1.

Also, according to the hydraulic pressure generating device 1 of the present embodiment, since the capacitor 902 functioning as the noise filter is disposed between the control board P1 and the external connection connector 903, it becomes easier to arrange the noise filter with respect to the control board P1 and the external connection connector 903. Also, since it is possible to dispose the control board P1 in the housing protrusion portion 95, the freedom of design of the control board increases.

In the hydraulic pressure generating device 1 configured as described above, as shown in FIG. 4, the axial lines L1, L2, and L3 of the cylinder bores 11, 21, and 41 and the axial line L4 of the output shaft 24*a* of the motor 24 are disposed in parallel, such that the cylinder bores 11, 21, and 41 and the motor 24 are disposed with good balance.

According to the hydraulic pressure generating device 1 of the present embodiment, the housing and the motor are disposed on one side and the other side of the base body 100 with reference to the reference plane S2 which is a virtual plane including the axial line L1 of the master cylinder 10, with good balance. Therefore, it is possible to reduce the size of the hydraulic pressure generating device 1 while improving the stability of the hydraulic pressure generating device 1.

In a state where the hydraulic pressure generating device 1 is mounted on a vehicle, since the slave cylinder 20 and the motor 24 are disposed below the master cylinder 10, the gravity center of the hydraulic pressure generating device 1 is low. Especially, since the motor 24 is a heavy component, the motor is disposed at a lower portion of the hydraulic pressure generating device 1, whereby it is possible to effectively improve the stability of the hydraulic pressure generating device 1.

According to the hydraulic pressure generating device 1 of the present embodiment, since the cylinder axis of the motor connector 201 is perpendicular to the axial line L4 of the motor 24, it is possible to extend the motor connector 201 toward the housing 91. Therefore, it is possible to electrically connect the motor 24 and the housing 91 at a relatively short distance. Therefore, the hydraulic pressure generating device 1 capable of reducing noise can be obtained.

According to the hydraulic pressure generating device 1 of the present embodiment, since the cylinder axis of the peripheral wall portion 92 of the housing 91 are disposed in parallel to the cylinder axis of the motor connector 201 and the cylinder axis of the housing connector 97, it is possible to easily establish the electrical connection of the motor 24 and the housing 91 by connecting the connectors of them, with the base body 100 interposed therebetween. Also, it is possible to electrically connect the motor 24 and the housing 91 at a relatively short distance by connecting both connectors. Therefore, it is possible to further reduce noise as compared to a case of connecting the motor and the housing by cables.

According to the hydraulic pressure generating device 1 of the present embodiment, since the cylinder axis of the housing connector 97 and the axial line L31 of the solenoid valve are disposed in parallel, and the direction in which the solenoid valve is assembled on the base body 100 is the same as the direction in which the two connectors 97 and 201 are connected, the hydraulic pressure generating device 1 excellent in assembly workability can be obtained.

According to the hydraulic pressure generating device 1 of the present embodiment, since the motor connector 201 and the housing connector 97 are connected at the same time as the housing 91 is assembled with the base body 100, the hydraulic pressure generating device 1 excellent in assembly workability can be obtained.

According to the hydraulic pressure generating device 1 of the present embodiment, since the motor 24 is connected to the connection terminal member 301 so as to be slidable in the cylinder axis direction, it is possible to adjust the distance between the motor 24 and the housing 91 while maintaining the electrical connection of the motor connector 201 and the housing connector 97 by the connection terminal member 301. In this case, it is easy to adjust the tension of the belt 25d of the drive transmission unit 25. Therefore, the hydraulic pressure generating device 1 excellent in assembly workability can be obtained.

Although the embodiment of the present invention has been described above, the present invention is not limited to the above-described embodiment, and can be appropriately modified without departing from the gist of the present invention.

For example, above the first cylinder bore 11, the second cylinder bore 21 and the output shaft 24a are disposed. In this case, as the hydraulic pressure generating device 1 is seen from the front-rear direction, the center point of the first cylinder bore 11, the center point of the second cylinder bore 21, and the center point of the output shaft 24a are disposed such that a line connecting them becomes an inverted triangle.

According to the hydraulic pressure generating device 1 of the present embodiment, as shown in FIG. 4, the output shaft 24a protrudes from the motor 24 toward the rear side. However, the motor 24 may be disposed such that the output shaft 24a protrudes from the motor 24 toward the front side.

For example, the motor 24 may be disposed on the rear side of the drive transmission unit 25, and the output shaft 24a protruding from the motor 24 toward the front side may be connected to the drive transmission unit 25.

According to the hydraulic pressure generating device 1 of the present invention, as shown in FIG. 5, the housing 91 is disposed above the second cylinder bore 21. However, the housing 91 may be disposed below the second cylinder bore 21.

According to the hydraulic pressure generating device 1 of the present embodiment, as shown in FIG. 1, the master cylinder 10 is a tandem piston type cylinder. However, the master cylinder 10 may be configured by a single piston type cylinder.

Also, according to the hydraulic pressure generating device 1 of the present embodiment, the slave cylinder 20 is a single piston type cylinder. However, the slave cylinder 20 may be configured by a tandem piston type cylinder.

Also, according to the present embodiment, the axial lines L1, L2, and L3 of the cylinder bores 11, 21, and 41 and the axial line L4 of the output shaft 24a of the motor 24 are disposed in parallel. However, the axial lines L1, L2, L3, and L4 may be inclined with respect to one another.

The invention claimed is:

1. A hydraulic pressure generating device comprising a base body having a master cylinder configured to generate a brake hydraulic pressure and a slave cylinder configured to generate a brake hydraulic pressure,
   wherein the base body is provided with a motor configured as a driving source for the slave cylinder and a control device configured to control the motor,
   wherein a motor shaft of the motor, a cylinder axis of the master cylinder, and a cylinder axis of the slave cylinder are disposed in parallel with each other, and
   wherein when a virtual plane including the cylinder axis of the master cylinder is set as a reference plane, a housing of the control device is disposed on one side of the reference plane and the motor is disposed on the other side of the reference plane.

2. A hydraulic pressure generating device according to claim 1,
   wherein the motor comprises a motor connector to be electrically connected to a control board contained in the housing, and
   wherein a cylinder axis of the motor connector is perpendicular to the motor shaft.

3. A hydraulic pressure generating device according to claim 2,
   wherein the housing comprises a cylindrical peripheral wall portion, a lid part attached to an opening of the peripheral wall portion, and a housing connector to be connected to the motor connector, and wherein a cylinder axis of the peripheral wall portion, the cylinder axis of the motor connector, and a cylinder axis of the housing connector are disposed in the same direction.

4. A hydraulic pressure generating device according to claim 3 comprising a solenoid valve which is attached to the base body, wherein the cylinder axis of the housing connector and an axial line of the solenoid valve be disposed in the same direction.

5. A hydraulic pressure generating device according to claim 3, wherein the motor connector and the housing connector have a common cylinder axis in the direction in which the housing is assembled with the base body.

6. A hydraulic pressure generating device according to claim 2, further comprising a connection terminal member disposed between the motor connector and the housing connector and configured to electrically connect the motor connector, wherein the motor connector is connected to the connection terminal member so as to be slidable in a cylinder axis direction.

7. A hydraulic pressure generating device according to claim 1, wherein the motor comprises a motor connector that is perpendicular to the motor shaft.

8. A hydraulic pressure generating device according to claim 7, wherein a cylinder axis of the motor connector is perpendicular to the motor.

9. A hydraulic pressure generating device according to claim 7, wherein the motor connector is slidable connected to a connection terminal member in a cylinder axis direction.

10. A hydraulic pressure generating device according to claim 7, wherein the motor connector includes a motor power connector and a motor control connector, wherein the motor power connector and the motor control connector have cylindrical shapes, wherein cylindrical axes of the motor power connector and the motor control connector are perpendicular to an axial line of an output shaft of the motor.

11. A hydraulic pressure generating device according to claim 10, further comprising motor side power supply terminals inside the motor power connector the motor side power supply terminals protruding in a direction of the cylinder axis perpendicular to the cylinder axis of the master cylinder.

12. A hydraulic pressure generating device according to claim 10, further comprising a scaling member mounted on an inner surface of the motor power connector, and a cylindrical retainer which holds the sealing member.

13. A hydraulic pressure generating device according to claim 11, further comprising an end portion of a power supply connector inserted into the motor power connector, wherein bus bars of the power supply connector are electrically connected to the motor side power supply terminals of the motor power connector by a connection terminal member.

14. A hydraulic pressure generating device according to claim 13, wherein the connection terminal member has motor side terminal accommodating holes formed adjacent to the motor and housing side terminal accommodating holes adjacent to a housing of the control device.

15. A hydraulic pressure generating device according to claim 14, further comprising:

first terminals connected with the motor side power supply terminals disposed in the motor side terminal accommodating holes; and second terminals connected with end portions of the bus bars of the power supply connector disposed in the housing side terminal accommodating holes.

16. A hydraulic pressure generating device according to claim 14, wherein the motor side terminal accommodating holes are three holes, wherein the housing side terminal accommodating holes are three holes, and wherein the motor side terminal accommodating holes and the housing side terminal accommodating holes are on opposing sides of the connection terminal member.

17. A hydraulic pressure generating device according to claim 13, wherein the motor connector and a housing connector are connected by the connection terminal member so as to be slidable in the cylinder axis direction.

18. A hydraulic pressure generating device according to claim 17, wherein the housing connector includes the power supply connector and a control connector, wherein the power supply connector has the bus bars for supplying electric power to the motor, wherein the control connector has control bus bars for controlling the operation of the motor, wherein cylinder axes of the power supply connector and the control connector are disposed in parallel to a direction of cylinder axis of a housing of the control device, and wherein an axial line of a solenoid valve is also disposed in parallel to the direction of the cylinder axis of the housing.

19. A hydraulic pressure generating device according to claim 18, wherein the power supply connector and the control connector are provided corresponding to connector holes of the base body, wherein the power supply connector has a cylindrical insertion portion inserted into a first of the connector holes, and wherein an end portion of the insertion portion protrudes from a side surface of the base body through the first connector hole.

20. A hydraulic pressure generating device according to claim 19, wherein the control connector has an insertion portion inserted into second connector holes of the connector holes, wherein an end portion of the insertion portion also protrudes from the side surface of the base body through the second connector holes, and wherein a cylinder axis of the insertion portion is a same axis as an axial line of the first connector hole.

* * * * *